US007690993B2

(12) United States Patent
Totaka et al.

(10) Patent No.: US 7,690,993 B2
(45) Date of Patent: Apr. 6, 2010

(54) GAME MUSIC GENERATING METHOD AND GAME APPARATUS

(75) Inventors: Kazumi Totaka, Kyoto (JP); Mitsuhiro Hikino, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1336 days.

(21) Appl. No.: 10/825,200

(22) Filed: Apr. 16, 2004

(65) Prior Publication Data

US 2004/0214638 A1 Oct. 28, 2004

(30) Foreign Application Priority Data

Apr. 28, 2003 (JP) ............................ 2003-123258

(51) Int. Cl.
*A63F 9/24* (2006.01)
*A63F 13/00* (2006.01)
*G06F 17/00* (2006.01)
*G06F 19/00* (2006.01)

(52) U.S. Cl. ............................ 463/35; 463/23; 463/30

(58) Field of Classification Search .................. 463/23, 463/35, 30
See application file for complete search history.

(56) References Cited

U.S. PATENT DOCUMENTS 4,956,775 A * 9/1990 Klamer et al. .............. 473/480
5,148,419 A * 9/1992 Koguchi .................. 369/30.08
5,741,185 A * 4/1998 Kwan et al. .................. 463/51
5,859,379 A * 1/1999 Ichikawa ..................... 84/609
6,096,962 A * 8/2000 Crowley ...................... 84/611
6,270,409 B1 * 8/2001 Shuster ........................ 463/20
2001/0016510 A1* 8/2001 Ishikawa et al. ............... 463/7
2001/0035087 A1 11/2001 Subotnick
2002/0023529 A1* 2/2002 Kurakake et al. ............. 84/610
2003/0037664 A1 2/2003 Comair et al.
2004/0017044 A1* 1/2004 Smith ......................... 273/432

FOREIGN PATENT DOCUMENTS

JP 05-181473 7/1993
WO WO 01/86630 11/2001

* cited by examiner

*Primary Examiner*—John M Hotaling, II
*Assistant Examiner*—Adetokunbo Torimiro
(74) *Attorney, Agent, or Firm*—Nixon & Vanderhye P.C.

(57) ABSTRACT

A game apparatus includes a CPU, and the CPU generates a game Background Music (BGM) corresponding to a proceeding situation of a game, and etc. The CPU selects data, from a main memory conductor, according to the proceeding of the game, and etc., and generates BGM data regarding one or more track data included in the conductor data. When generating the BGM data, rhythm data, within a rhythm group designated by the track data, is selected in predetermined order or at random, and phrase data, within the same designated phrase group, is selected at random. Then, the BGM data is generated from the selected rhythm data and the phrase data.

14 Claims, 20 Drawing Sheets

(A) PHRASE DATA STORING AREA 770

(B) RHYTHM PATTERN STORING AREA 78

DATA STRUCTURE OF CONDUCTOR DATA 720

GAME MUSIC GENERATING METHOD AND GAME APPARATUS

FIELD

The illustrative embodiments relate to a storing medium that stores a game Background Music ("BGM") generating program, a game BGM generating method, and a game device. More specifically, the illustrative embodiments relate to a game BGM generating program, a game BGM generating method, and a game device that generate a BGM performed for enhancing liveliness as a series of staging in accordance with an atmosphere of a game stage.

BACKGROUND AND SUMMARY OF THE INVENTION

Conventionally, in game software operated in a game such as a television game device, a liquid crystal game device, etc., a BGM is prepared, in order to enhance liveliness of a game, and a player plays the game listening to the BGM. Similar to a game screen, a plurality of kinds of BGM are prepared in advance and selectively output accordingly as the game proceeds. Generally, data of a musical composition of this BGM is performed from a start to an end, and this performance is repeated. In addition, in order to prevent the BGM from becoming monotonous, when a player character encounters an enemy character, and when a game scene is changed to a fighting scene, a different BGM is performed. Or, if a time limit set in advance approaches, the tempo of the performance becomes fast, and so forth.

In addition, in order to prevent the BGM from becoming monotonous, the BGM can automatically be generated according to a method taught in Japanese Patent No. 3271282 [G10H 1/00, G10H 1/40] registered on Jan. 25, 2002. In the automatic generating method of the BGM taught in this prior art, a phrase database is prepared in advance, a phrase is newly generated based on a selected phrase, and a melody is automatically generated.

However, even if the BGM is changed accordingly as the game proceeds, and the tempo of the BGM is changed as in the former, the same BGM is performed in the same scene, so that the player may be tired of the BGM, and the player's interest in the game may decrease.

In the latter, it is possible to generate a variety of BGMs, to prevent a probable loss of interest. However, as an apparatus that generates the BGM for a game, its scale may be large. In addition, the generating process of the phrase and the melody may be huge, so there is a problem that a different process needed for the game proceeding may be suppressed. As such is the case, the taught art may not be suitable for the game device.

The illustrative embodiments provide: a novel storing medium that stores a game BGM generating program, a game BGM generating method, and game device.

The illustrative embodiments provide: a storing medium that stores a game BGM generating program, a game BGM generating method, and a game device capable of generating a variety of BGMs while not increasing the process load.

A storing medium that stores a game BGM generating program according to an illustrative embodiment, and the game BGM data generating program, are executed by a game device. The game device comprises a phrase data storing means, a rhythm-pattern storing means, a BGM-data reproducing means, a tone-color-data storing means, and a sound outputting means. The phrase data storing means stores different kinds of a plurality of phrase data, by each group, based on a musical characteristic, that designate a length and a pitch of a pronunciation of a tone color. The rhythm-pattern storing means stores at least one kind of rhythm pattern data, constructed of two or more sets of rhythm data that designate a length in performance for playing a phrase, and a pronunciation timing of the phrase. The BGM-data reproducing means reproduces BGM data constructed of at least one part. The tone-color-data storing means stores data of a sound output according to the BGM data. Furthermore, the sound outputting means outputs the sound according to the BGM data reproduced by the BGM-data reproducing means. The game BGM generating program allows a processor of the game device to execute a phrase selecting step, a rhythm selecting step, and a BGM generating step. The phrase selecting step randomly selects one kind of the phrase data from one group stored in the phrase data storing means. The rhythm selecting step selects one rhythm data from one kind of the rhythm pattern data stored in the rhythm-pattern storing means according to a predetermined rule. Furthermore, the BGM generating step generates the BGM data from the phrase data selected by the phrase selecting step and the rhythm data selected by the rhythm selecting step.

More specifically, the game device (12: reference numeral used for illustrative purposes only) comprises a phrase data storing means (40, 76), a rhythm-pattern storing means (40, 78), a BGM-data reproducing means (36), a tone-color-data storing means (40, 54), and a sound outputting means (34*a*, 52, 62). The phrase data storing means (40, 76) stores different kinds of a plurality of phrase data that designate a length and a pitch of a pronunciation of a tone color, by each group, based on a musical characteristic. The phrase corresponds to a musical score (musical script) of one part of a music composition, the data corresponding thereto is the phrase data, for example. The rhythm-pattern storing means (40, 78) stores at least one kind of rhythm pattern data, constructed of the rhythm data that designates a length in performance for performing a phrase, and a pronunciation timing of the phrase. The rhythm is defined by a musical tone, and the data corresponding to the musical tone is the rhythm data, for example. The BGM-data reproducing means (36) reproduces BGM data constructed of at least one part (musical instrument and orchestra). The tone-color-data storing means (40, 54) stores a sound output according to the BGM data, that is, data representing the musical instrument and the orchestra. The sound outputting means (34*a*, 52, 62) outputs the sound according to the BGM data reproduced by the BGM-data reproducing means (36, S113, S183). That is, the BGM is reproduced. The game BGM generating program allows a processor of the game device to execute a phrase selecting step (S91, S157), a rhythm selecting step (S59, S133), and a BGM generating step (S113, S183). The phrase selecting step (S91, S157) randomly selects one kind of phrase data from one group stored in the phrase data storing means (40, 76). The rhythm selecting step (S59, S133) selects the rhythm data from one kind of rhythm pattern data stored in the rhythm-pattern storing means (40, 78) according to a predetermined rule. The BGM generating step (S113, S183) generates the BGM data from the phrase data selected by the phrase selecting step (S91, S157) and the rhythm data selected by the rhythm selecting step (S59, S133).

According to an illustrative embodiment, the BGM data is generated from the phrase data selected randomly and the rhythm data selected according to a predetermined rule so that it is possible to generate the various BGM data. In addition, the phrase data and the rhythm data are prepared in advance so that a generating process of the data is not needed, this makes it possible to prevent a process load from becoming too large.

According to a certain feature of an illustrative embodiment, the rhythm selecting step includes a random-selecting step for randomly selecting the rhythm data from one kind of rhythm pattern data. More specifically, the random-selecting method (S133) randomly selects a rhythm from one kind of rhythm pattern data so that it is possible to perform the BGM according to the various rhythm patterns.

In another feature of an illustrative embodiment, the rhythm selecting step includes a sequential-selecting step for selecting the rhythm data from one kind of rhythm pattern data in predetermined order. More specifically, the rhythm selecting step (S59) selects the rhythm data from one kind of rhythm pattern data in predetermined order so that it is possible to perform the BGM according to a rhythm pattern set in advance.

In a certain feature of an illustrative embodiment, the game device further comprises a continuous counter for counting the number of times the same phrase has been selected. The phrase selecting step includes an incrementing step and a re-selecting step. The incrementing step increments the continuous counter when the phrase data selected last time and the phrase data selected this time agree. The re-selecting step re-selects the phrase data when a count value of the continuous counter is greater than a predetermined value. More specifically, the game device (12) further comprises a continuous counter (40, 82*d*) for counting the number of times the same phrase has been selected. The incrementing step (S95, S161) increments the continuous counter (40, 82*d*) when the phrase data selected last time and the phrase data selected this time agree. The re-selecting step (S91, S157) re-selects the phrase data when a count value of the continuous counter (40, 82*d*) is greater than a predetermined value. That is, the BGM is prevented from becoming monotonous as a result of the same phrase being repeatedly selected.

In another feature of an illustrative embodiment, the game device further comprises an operating means for inputting an operation from a player; and a performance-change data storing means for storing performance-change data that changes a performing method of a BGM. The game BGM generating program further allows the processor to execute a performance-change data storing step, and a BGM-data change step. The performance-change data storing step allows the performance-change data storing means to store the performance-change data corresponding at a minimum to the operation of the operating means. The BGM-data change step applies a predetermined change to the BGM data corresponding to the performance-change data stored in the performance-change data storing means by the performance-change data storing step. More specifically, the game device (12) further comprises an operating means (22, 26) for inputting an operation from a player; and a storing means (40, 80) for storing performance-change data that changes a performing method of a BGM. The game BGM generating program executes a performance-change data storing step (S21, S25, S33), and a BGM-data change step (S119, S121, S125, S171, S187, S191). The performance-change data storing step (S21, S25, S33) stores performance-change data into the performance-change data storing means (40, 80) corresponding to at least the operation of the operating means. However, the performance-change data may also be stored corresponding to a proceeding situation of the game, a predetermined event, etc. The BGM-data change step (S119, S121, S125, S171, S187, S191) applies a predetermined change to the BGM data corresponding to the performance-change data stored in the performance-change data storing means (40, 80). That is, as a result of the performance of the BGM being changed, corresponding to the operation of the player, etc., a staging effect of a game content, etc., is enhanced not only by a game screen but also by the BGM.

In a certain feature of an illustrative embodiment, the BGM-data change step includes a tempo change step for changing a tempo of the BGM data according to the performance-change data. More specifically, the tempo change step (S125, S191) changes the tempo of the BGM data according to the performance-change data. That is, it is possible to alter the performance speed of the BGM.

In another feature of an illustrative embodiment, the game device further comprises a period designating data storing means for storing period designating data that designates a performing period and a performance suspended period of the phrase. The BGM-data reproducing means suspends a reproduction of the BGM data in the performance suspended period based on the period designating data. The game BGM generating program further allows the processor to execute a period counting step, for counting the performing period and the performance suspended period, designated by the period designating data, by the number of times the rhythm data is selected. More specifically, the game device (12) includes a period designating data storing means (40, 82*b*, 82*c*) for storing period designating data, that designates a performing period and a performance suspended period of the phrase. The BGM-data reproducing means (36) suspends a reproduction of the BGM data in the performance suspended period, based on the period designating data. In the game BGM generating program, a period counting step counts the performing period and the performance suspended period, designated by the period designating data, by the number of times the rhythm data has been selected. Thus, the performing period and the performance suspended period are counted by the number of times the rhythm is selected, so that even where the state is returned (moved) from a performance suspended state to a performing state, no deviance occurs to a performing timing of the BGM.

A game BGM generating method according to an illustrative embodiment is a game BGM generating method in a game device provided with a phrase data storing means, a rhythm-pattern storing means, a BGM-data reproducing means, a tone-color-data storing means, and a sound outputting means. In this game device, the phrase data storing means stores different kinds of a plurality of phrase data that designate a length and a pitch of a pronunciation of a tone color, by each group, based on a musical characteristic. The rhythm-pattern storing means stores at least one kind of rhythm pattern data, constructed of two or more sets of rhythm data, that designate a length in performance for performing a phrase, and a pronunciation timing of the phrase. The BGM-data reproducing means reproduces BGM data constructed of at least one part. The tone-color-data storing means stores data of a sound output according to the BGM data. Furthermore, the sound outputting means outputs the sound according to the BGM data reproduced by the BGM-data reproducing means. This game device (a) randomly selects one kind of phrase data from one group stored in the phrase data storing means, (b) sequentially or randomly selects one rhythm data from one kind of rhythm pattern data stored in the rhythm-pattern storing means, and (c) generates the BGM data from the phrase data selected by the step (a) and the rhythm data selected by the step (b).

A game device according to an illustrative embodiment is a game device that performs a BGM corresponding at a minimum to a proceeding situation of a game. This game device comprises a phrase data storing means, a rhythm-pattern storing means, a BGM-data reproducing means, a tone-color-data storing means, a phrase selecting means, a rhythm-pattern selecting means, a BGM generating means, and a sound outputting means. The phrase data storing means stores different kinds of a plurality of phrase data that designate a length and a pitch of a pronunciation of a tone color, by each group, based on a musical characteristic. The rhythm-pattern storing means stores at least one kind of rhythm pattern data, constructed of two or more sets of rhythm data, that designate a length in performance for performing a phrase, and a pronunciation timing of the phrase. The BGM-data reproducing means reproduces BGM data constructed of at least one part. The tone-color-data storing means stores data of a sound output according to the BGM data. The phrase selecting means randomly selects one kind of phrase data from one group stored in the phrase data storing means. The rhythm-pattern selecting means selects one rhythm data from one kind of rhythm pattern data stored in the rhythm-pattern storing means according, to a predetermined rule. The BGM generating means generates the BGM data from the phrase data selected by the phrase selecting step and the rhythm data selected by the rhythm pattern selecting step. Furthermore, the sound outputting means outputs the sound according to the BGM data reproduced by the BGM-data reproducing means.

In an illustrative embodiment of the game BGM generating method and also in the game device, similar to the illustrative embodiment of the storing medium that stores the game BGM generating program, it is possible to generate a variety of BGMs without increasing the process load.

The above described features of the illustrative embodiments will become more apparent from the following detailed description of the illustrative embodiments when taken in conjunction with the accompanying drawings.

DETAILED DESCRIPTION OF THE ILLUSTRATIVE EMBODIMENTS

Figure 1:
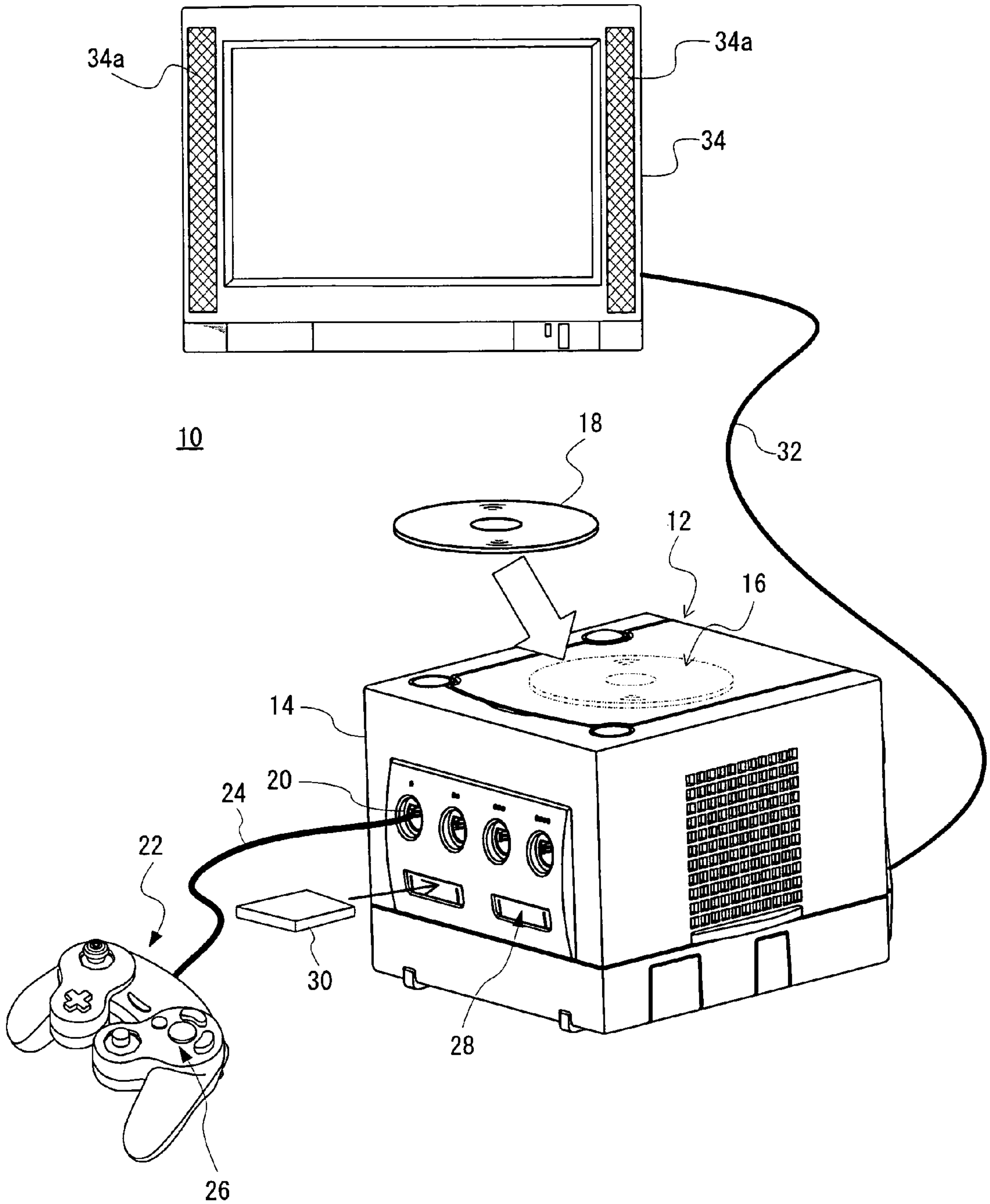
FIG. 1 is an illustrative view showing one example of a game system of the illustrative embodiments.

Referring to FIG. 1, a video game system 10 of an illustrative embodiment includes a video game device 12. Power is supplied to this video game device 12, and this power may be an ordinary AC adaptor (not shown). The AC adaptor is inserted into a home-use conventional wall outlet, and converts a home-use power into a low DC voltage signal appropriate for driving the video game device 12. In another illustrative embodiment, a battery may be used as the power.

The video game device 12 includes an approximately cubic housing 14, and at an upper end of the housing 14, an optical disk drive 16 is provided. In the optical disk drive 16, an optical disk 18, which is one example of an information storing medium that stores a game program, etc., is attached. At a front surface of the housing 14, a plurality of (4 in this embodiment) connectors 20 are provided. These connectors 20 are connectors for connecting a controller 22 to the video game device 12 by a cable 24, and in this illustrative embodiment, it is possible to connect a maximum of four controllers to the video game device 12.

In the controller 22, an operating means (control) 26 is provided at its upper, lower, side surfaces, etc. The operating means 26 includes two analog joysticks, one cross key, a plurality of button switches, etc. One analog joystick is used for inputting a moving direction and/or a moving speed or a moving amount of a player character (moving image character operable by the player using the controller 22) by a slanting amount and a direction of the stick. Another analog joystick controls game play by a movement of a virtual camera, for example. The cross switch is used for instructing the moving direction of the player character in place of the analog joystick. The button switch is used for instructing the movement of the player character, changing a viewpoint of the virtual camera of a three-dimensional image, adjusting the moving speed of the player character, and so forth. Furthermore, the button switch controls a menu selection, and a pointer or a cursor movement, for example.

It is noted that in this illustrative embodiment, the controller 22 is connected to the video game device 12 by the cable 24 integrally provided therewith. However, the controller 22 may be connected to the video game device 12 by another method such as a wireless manner via an electromagnetic wave (radio wave or infrared ray), for example. In addition, specific structure of the operating means 26 of the controller 22 is not limited to the structure of the illustrative embodiment, and an arbitrary configuration is possible. One analog joystick may be sufficient, or may not be used at all, for example. The cross switch may not be used, etc.

Below the connector 20 at the front surface of the housing 14 of the video game device 12, at least one (2 in this embodiment) memory slot 28 is provided. A memory card 30 is inserted into this memory slot 28. The memory card 30 is used for loading and temporarily storing a game program, etc., read out from the optical disk 18, saving game data (result of the game, for example) of the game played using this game system 10, and so forth.

At a rear surface of the housing 14 of the video game device 12, an AV cable connector (not shown) is provided, and using the connector, a monitor 34 is connected to the video game device 12 through an AV cable 32. Typically, the monitor 34 is a color television receiver, and the AV cable 32 inputs a video signal from the video game device 12 to a video input terminal of the color television, and applies a sound signal to an audio input terminal. Therefore, a game image of a three-dimensional (3D) video game may be displayed on the color television (monitor) 34, and a stereo game sound such as a game music, a sound effect, and etc., may be output from speakers 34*a* on both sides. Or, in a case that it is possible to realize a surround effect even in the two speakers, the game sound including a surround sound is output.

In this game system 10, in order for a user or a game player to play the game (or another application), the user, first, turns on the power of the game device 12, next, the user selects the appropriate optical disk 18 that stores a video game (or another application intended to play), and loads the optical disk 18 into the disk drive 16 of the game device 12. Accordingly, the user allows the game device 12 to start executing the video game or another application based on software stored in the optical disk 18. The user operates the controller 22 in order to apply an input to the game device 12. The user starts the game or another application by operating one of features of the operating means 26, for example. By moving another feature of the operating means 26, it becomes possible to move the moving image character (player character) to a different direction or change a viewpoint (camera location) of the user in a three-dimensional (3D) game world.

Figure 2:
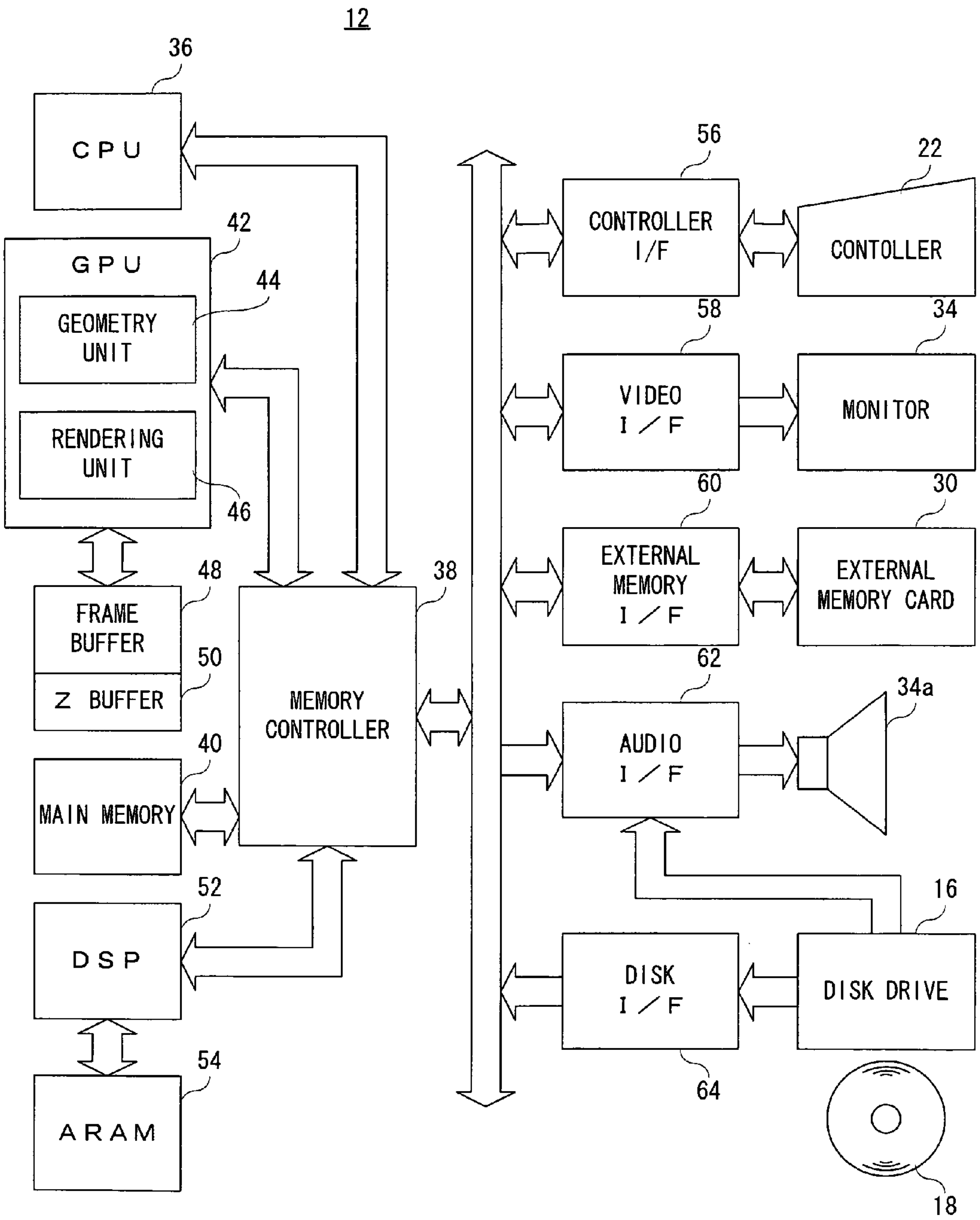
FIG. 2 is block diagram showing electric structure of a video game device shown in a FIG. 1 embodiment.

FIG. 2 is a block diagram showing electric structure of the video game system 10 of a FIG. 1 embodiment. In the video game device 12, a central processing unit (hereinafter briefly referred to as "CPU") 36 is provided. The CPU 36 is also called a computer or a processor, etc., and is responsible for entirely controlling the video game device 12. The CPU 36 or computer functions as a game processor, and the memory controller 38 is joined to this CPU 36 via a bus. Primarily, the memory controller 38 controls a writing or a reading of the main memory 40 joined via the bus under the control of the CPU 36. To this memory controller 38, a GPU (Graphics Processing Unit) 42 is joined.

The GPU 42 forms one portion of a rendering means, is constructed of a single chip ASIC, for example, and receives a graphics command (rendering instruction) from the CPU 36 via the memory controller 38 so as to generate a three-dimensional (3D) game image by a geometric unit 44 and a rendering unit 46 according to that command. That is, the geometric unit 44 performs coordinate operation processes such as a rotation, a movement, a deformation, etc., of various characters and objects in a three-dimensional coordinate system (constructed of a plurality of polygons. In addition, the polygon is a polygonal plain surface defined by at least three vertexes coordinates). The rendering unit 46 performs an image generating process such as attaching a texture (texture image) to each polygon of the various objects, and so forth. Therefore, the 3D image data to be displayed on the game screen is generated (created) by the GPU 42, and the image data is rendered (stored) within a frame buffer 48.

It is noted that the data (primitive or polygon or texture, and etc.) necessary for the GPU 42 to execute the graphics command is obtained by the GPU 42 from the main memory 40 via the memory controller 38.

The frame buffer 48 is a memory for rendering (accumulating) the image data worth 1 frame of a luster scanning monitor 34, for example, and overwritten by the GPU 42 by each 1 frame. As a result of a video I/F 58 described later reading out the data of the frame buffer 48 via the memory controller 38, the 3D game image is displayed on the screen of the monitor 34.

In addition, a Z buffer 50 has a storing capacity equal to the number of bits of depth data per the number of pixels (storing location or address) corresponding to the frame buffer 48 X one pixel, and stores depth information or the depth data (Z value) of dots corresponding to each storing location of the frame buffer 48.

It is noted that both of the frame buffer 48 and the Z buffer 50 may be constructed using one portion of the main memory 40.

The memory controller 38 is also joined to an ARAM 54 via a DSP (Digital Signal Processor) 52. Therefore, the memory controller 38 controls the writing and/or reading-out of not only the main memory 40 but also the ARAM 54 as a sub memory.

The DSP 52 functions as a sound processor, and according to an instruction of the CPU 36, uses sound waveform data (FIG. 5) written in the ARAM 54 so as to generate audio data corresponding to the music (sound effect), a sound or voices, or the music (BGM) necessary for the game.

Furthermore, the memory controller 38 is joined to each interface (I/F) 56, 58, 60, 62, and 64 by the bus. The controller I/F 56 is an interface for the controller 22, and applies an operating signal of the operating means of the controller 22 or data through the memory controller 38 to the CPU 36. The video I/F 58 access the frame buffer 48, reads out the image data created by the GPU 42, and applies the image signal or the image data (digital RGB pixel value) to the monitor 34 via the AV cable 32 (FIG. 1).

The external memory I/F 60 joins the memory card 30 (FIG. 1) inserted in the front surface of the game device 12 to the memory controller 38. Thereby, it enables the CPU 36 to write the data into this memory card 30 via the memory controller 38, or read out the data from the memory card 30. The audio I/F 62 receives the audio data applied from the DSP 52 through the memory controller 38 or an audio stream read out from the optical disk 18, and applies 34 the audio signal (sound signal) corresponding thereto to the speaker 34*a* of the monitor.

It is noted that in a case of stereo sound, at least one speaker 34*a* is provided on each of both sides. In addition, as a result of the surround reproduction being performed, it is possible to make the sound to be heard as if the sound were generated from behind the player, even if there are only two speakers on the both sides.

Furthermore, the disk I/F 64 joins the disk drive 16 to the memory controller 38, and the CPU 36 controls the disk drive 16. Program data, the texture data, etc., read out from the optical disk 18 by this disk drive 16 are written into the main memory 40 under the control of the CPU 36.

Figure 3:
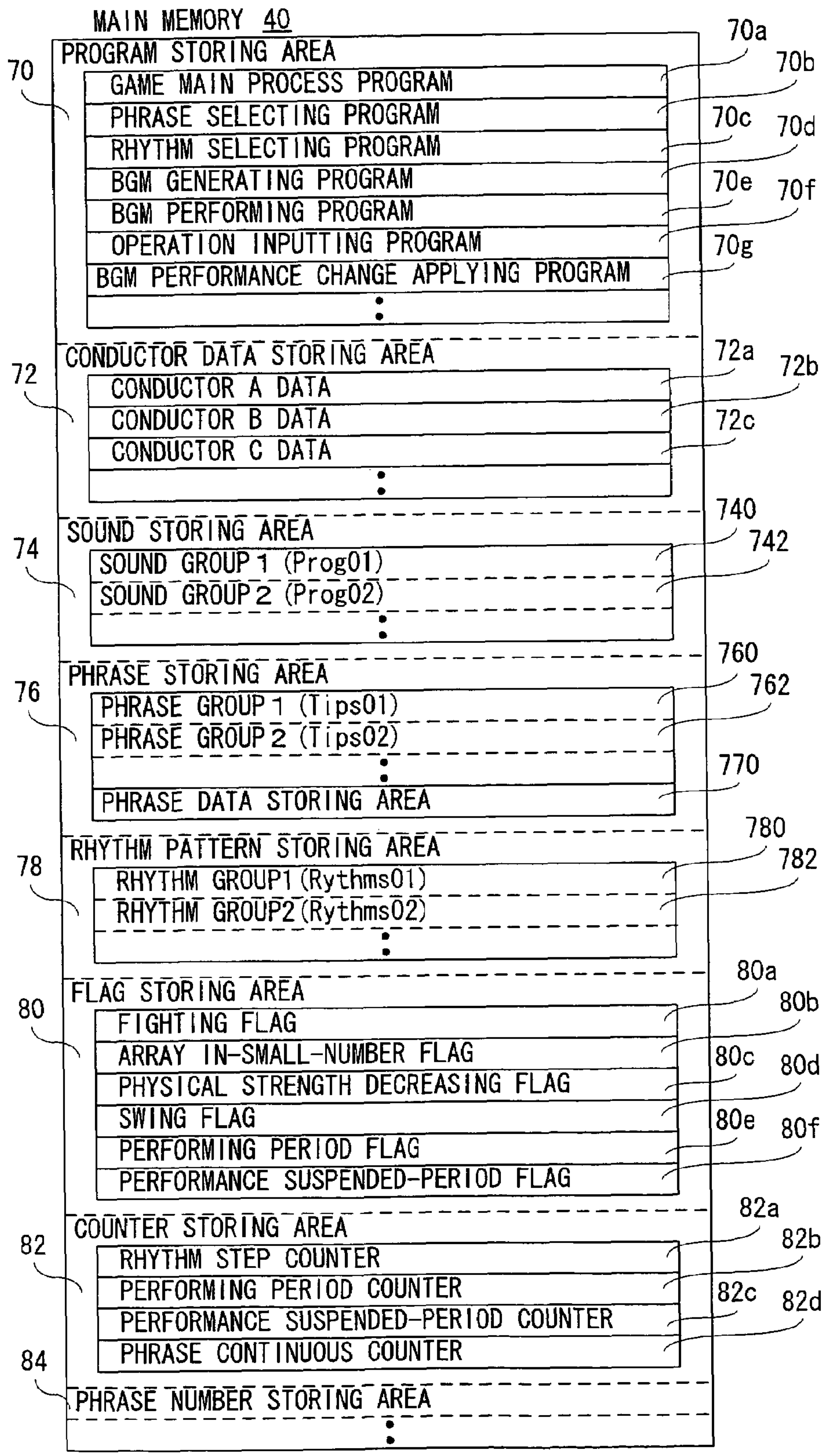
FIG. 3 is an illustrative view showing a memory map of a main memory shown in FIG. 2.

FIG. 3 shows a memory map of the main memory 40. The main memory 40 includes a program storing area 70, a conductor data storing area 72, a tone color storing area 74, a phrase storing area 76, a rhythm-pattern storing area 78, a flag storing area 80, a counter storing area 82, a phrase-number storing area 84, etc. In the program storing area 70, the game program read out from the optical disk 18 is stored at once or partially and sequentially. This game program is constructed of a game main processing program 70*a*, a phrase selecting program 70*b*, a rhythm selecting program 70*c*, a BGM generating program 70*d*, a BGM performing program 70*e*, an operation inputting program 70*f*, a BGM performance-change applying program 70*g*, etc., in this embodiment.

The game main processing program 70*a* is a program for processing a main routine of the game. The phrase selecting program 70*b* is a program for randomly selecting phrase data from a phrase group indicated by conductor data described later. The rhythm selecting program 70*c* is a program for selecting (in order or randomly) rhythm data from a rhythm group, indicated by the conductor data described later, according to a predetermined rule. The BGM generating program 70*d* is a program for generating BGM data from the phrase data selected by the phrase selecting program 70*b* and the rhythm data selected by the rhythm selecting program 70*c*.

It is noted that a plurality of kinds of the conductor data are prepared as described later, and one conductor data is selected by the game main processing program 70*a* according to the proceeding situation of the game, etc.

The BGM performing program 70*e* is a program for performing (reproducing) the BGM data generated by the BGM generating program 70*d*. The operation inputting program 70*f* is a program for detecting the operation input of the controller 22 (operating means 26) from the player. The BGM performance-change applying program 70*g* is a program for applying a change in performance (output) of the BGM corresponding to the operation input detected by the operation inputting program 70*f*, the proceeding situation of the game, or an event, etc.

Although not illustrated, as the game program, an image processing program is also stored, and as a result of the execution of this image processing program, an image of the virtual three-dimensional space (game world) of the game is displayed on the monitor 34, an image regarding a character such as the player character, the enemy character, and an item (weapon, gold coin, food, equipment, medicine, etc.), or an object such as a building, a wall, a tree, and etc., is displayed.

In the conductor data storing area 72, different kinds of a plurality of conductor data such as conductor A data 72*a*, conductor B data 72*b*, conductor C data 72*c*, . . . are stored in this illustrative embodiment. Herein, a "conductor" means a "conductor (for orchestra)", and in this illustrative embodiment, the conductor data is data for generating the BGM data. Each of the conductor data 72*a*-72*c*, which will be described in detail later, is constructed of tempo data and at least one track data. Furthermore, the track data is constructed of data (tone color group number data) indicating the number (reference number) of the program (tone color), data (phrase group number data) indicating the number (reference number) of the phrase group, data (rhythm group number data) indicating the number (reference number) of the rhythm group, etc., (see FIG. 7).

It is noted that similar to the game program, these conductor data 72*a*-72*c* are loaded all at once or partially and sequentially from the optical disk 18 as required.

Figure 4:
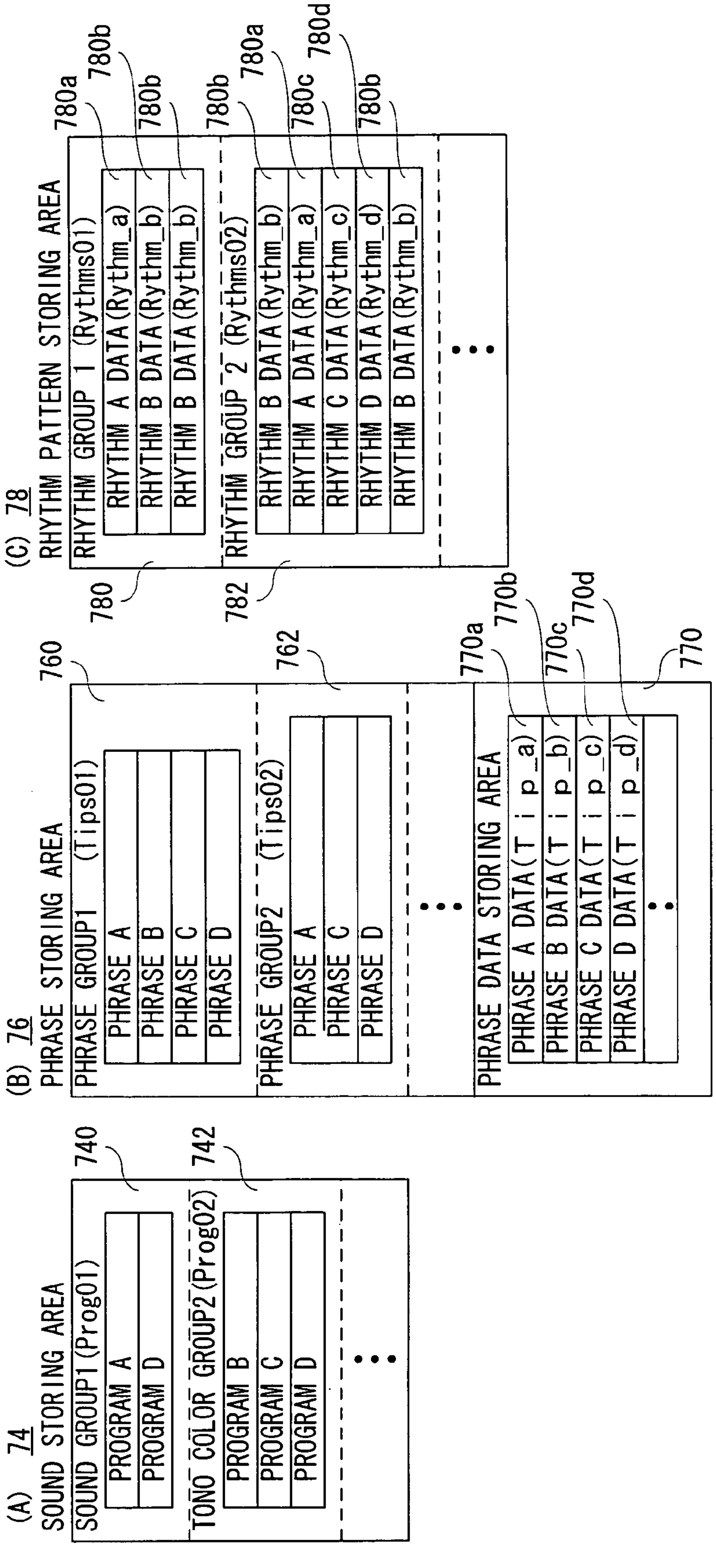
FIG. 4 is an illustrative view showing one portion of the memory map shown in FIG. 2.

In this embodiment, the tone color storing area 74 is further constructed of a plurality of storing areas divided by each group unit, that is, a storing area 740 for a tone-color group 1 (Prog01), a storing area 742 for a tone-color group 2 (Prog02), . . . . Each of the storing area 740 and the storing area 742 stores data of the number (reference number) allotted to the data (sound waveform data described later) of one or more of tone colors as shown in FIG. 4 (A). It is noted that for the sake of simplicity, a name (file name) of the sound waveform data described later (see FIG. 5) is written in FIG. 4 (A). That is, in the storing area 740, a program (tone color) A and a program D are written, and in the storing area 742, a program B, a program C, and the program D are written.

It is noted that, as understood from FIG. 4 (A), within each storing area, the number of different kinds of tone color data is written, however, in a different storing area, the number of the same kind of the tone color data may be written.

In addition, the group of such tone colors is set by a developer, such as a programmer of the game, etc., in advance.

Figure 5:
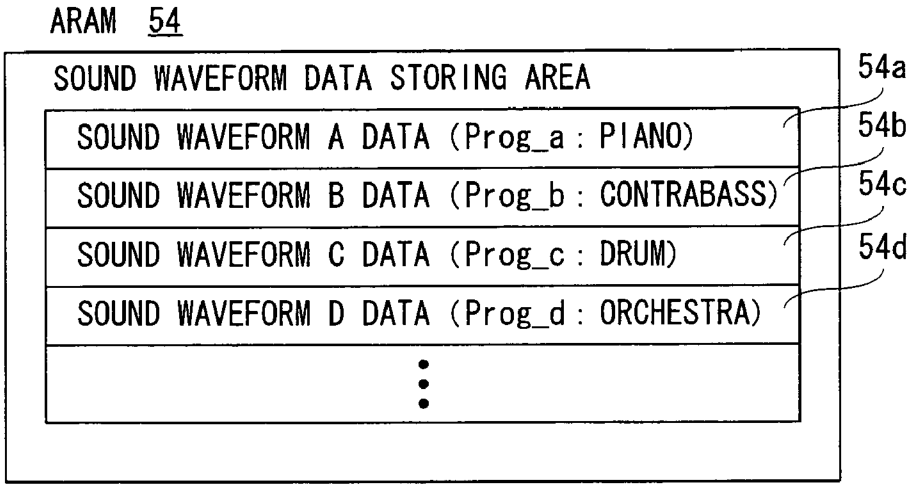
FIG. 5 is an illustrative view showing a memory map of an ARAM shown in FIG. 2.

As shown in FIG. 5, the tone color data, that is, the sound waveform data, is loaded and written into the sound waveform data storing area, which is the ARAM 54 that serves as the sub memory in this embodiment, from the optical disk 18. As shown in FIG. 5, the sound waveform data regarding a sound by each part is stored in the sound waveform data storing area, the ARAM 54, for example, and as a principle, one part corresponds to one musical instrument. It is noted that one part may correspond to two or more musical instruments such as a sound of an orchestra. More specifically, in this illustrative embodiment, sound waveform A data (Prog_a) 54*a*, the sound of a piano, sound waveform B data (Prog_b) 54*b*, the sound of a bass (contrabass), sound waveform C data (Prog_c) 54*c*, the sound of a drum, sound waveform D data (Prog_d) 54*d*, the sound of the orchestra, etc., are stored. Although not illustrated, sound waveform data of other parts is also stored.

That is, the DSP 52 generates audio data corresponding to the sound (sound effect), voices, or the music (BGM) necessary for the game, using one of, or two or more of the sound waveform data 54*a*, 54*b*, 54*c*, 54*d*, . . . , under the instruction of the CPU 36.

Returning to FIG. 3, the phrase storing area 76 is further constructed of a plurality of storing areas divided by each group unit, that is, a storing area 760 for a phrase group 1, a storing area 762 for a phrase group 2, . . . , and a storing area 770 in this illustrative embodiment. As shown in FIG. 4 (B), in each of the storing area 760 and the storing area 762, data of the number (reference number) allotted to one or a plurality of the phrase data is stored. The number of different kinds of the phrase data having a similar (approximate) musical characteristic is stored as the number of the phrase data stored in one storing area, that is, in one group. Herein, "having a similar musical characteristic" means that even if any phrase is performed during a musical composition, a player does not feel a sense of inconsistency.

However, for the sake of simplicity, a name (file name) of the phrase data is written in this Figure. That is, in this embodiment, a phrase A, a phrase B, a phrase C, and a phrase D are written in the storing area 760, and the phrase A, the phrase C, and the phrase D are written in the storing area 762.

In addition, different kinds of a plurality of the phrase data are stored in the phrase data storing area 770. In this embodiment, phrase A data (Tip_a) 770*a*, phrase B data (Tip_b) 770*b*, phrase C data (Tip_c) 770*c*, phrase D data (Tip_d) 770*d*, . . . , are stored.

Figure 6:
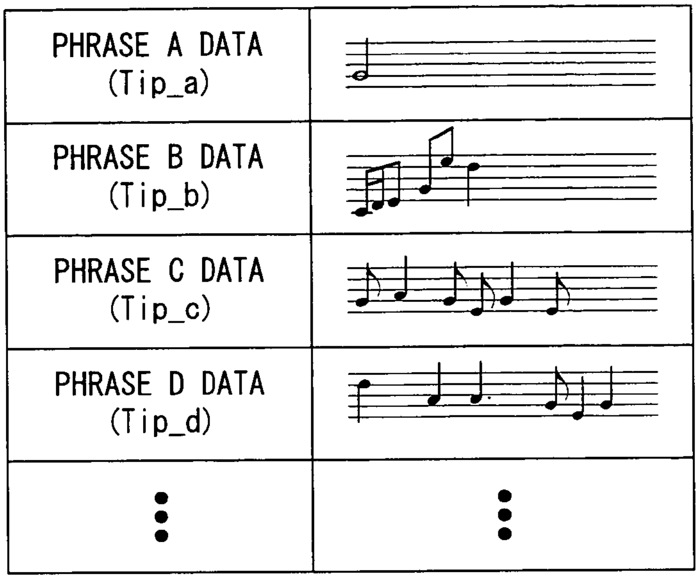
FIG. 6 is an illustrative view showing phrase data and rhythm data shown in FIG. 3.
Figure 6:
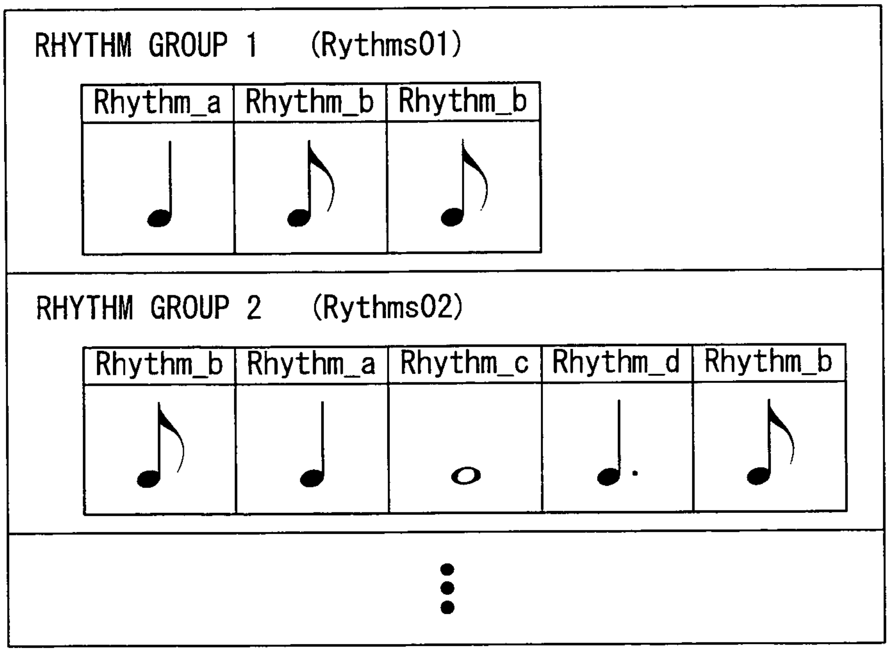

Herein, the phrase means a musical score (musical script) of one portion of the musical composition, and its minimum constitutional unit is one musical tone. More specifically, as shown in FIG. 6 (A), in the phrase aligned are one or more musical note(s) that designate(s) a length and a pitch (pitch of sound; height of the sound) of a pronunciation of the tone color. This phrase is determined in advance by a developer such as a game programmer.

To be described more specifically, in this embodiment, the phrase that corresponds to the phrase A data 770*a* is constructed of one half note, and the pitch of the sound of this musical note corresponds to a "so" note when only a treble clef is indicated. In addition, the phrase that corresponds to the phrase B data 770*b* is constructed of a sixteenth note, a sixteenth note, an eighth note, an eighth note, an eighth note, and a quarter note starting from left, and the pitch of the sound of each musical note corresponds to notes of "do", "re", "mi", "so", "si", "mi/" (/ means a note above one octave (perfect eighth). Hereinafter, the same is true.) and re/ when only the treble clef is indicated. Furthermore, the phrase that corresponds to the phrase C data 770*c* is constructed of an eighth note, a quarter note, an eighth note, an eighth note, a quarter note, and an eighth note starting from left, and the pitch of the sound of each musical note corresponds to notes of "so", "la", "so", "mi", "so", and "mi" when only the treble clef is indicated. In addition, the phrase that corresponds to the phrase D data 70*d* is constructed of a quarter note, a quarter note, a dotted quarter note, (length of a quarter note+an eighth note), an eighth note, a quarter note, and quarter note starting from left, and the pitch of the sound of each musical note corresponds to notes of "re/", "la", "so", "mi", and "so" when the treble clef is indicated.

That is, the phrase data is data representing the musical score of one portion of the musical composition, and data that designates (defines) the length of the tone color to be pronounced and the pitch of sound (musical scale).

It is noted that as shown in FIG. 4 (B), the reason why the phrase data is not directly stored in the storing area of the phrase group, and the storing area of the phrase group and the phrase data storing area are separately provided is that there is a case that the same phrase data is included even in the different phrase group, and a data amount is prevented from becoming large.

Returning to FIG. 3, the rhythm-pattern storing area 78 is further constructed of a plurality of storing areas divided by each group unit, that is, a storing area 780 for a phrase group 1, a storing area 782 for a phrase group 2, . . . in this illustrative embodiment. In each of the storing areas, data (rhythm data) having two or more patterns is stored. More specifically, as shown in FIG. 4 (C) in the storing area 780, rhythm A data (Rhythm_a) 780*a*, rhythm B data (Rhythm_b) 780*b*, and the same rhythm B data (Rhythm_b) 780*b* are stored. In addition, in the storing area 782, the rhythm B data 780*b*, the rhythm A data 780*a*, rhythm C data (Rhythm_c) 780*c*, rhythm D data (Rhythm_d) 780*d*, and the rhythm B data 780*b* are stored.

This rhythm data is data representing one musical tone that designates the length in performance (pronunciation) for performing the phrase (data), and a timing (pronunciation timing) of a pronunciation (starting a performance) of the phrase (data). As a result of the rhythm data, included within one group, being selected sequentially or randomly, the pattern (rhythm pattern) of a certain rhythm is formed, for example. In this respect, it can be said that collectively, the rhythm data included within one group is the rhythm pattern data.

In this illustrative embodiment, as shown in FIG. 6 (B), a rhythm group 1 (Rhythms01) forms the rhythm pattern by the quarter note that corresponds to the rhythm A data 780*a*, the eighth note that corresponds to the rhythm B data 780*b*, and the eighth note that corresponds to the same rhythm B data 780*b*, starting from left.

If a sequential-selecting method is selected as a selecting method of the rhythm, the rhythm data is selected in order from a head (starting from left), that is, the rhythm A data 780*a*, the rhythm B data 780*b*, the rhythm B data 780*b* are selected in this order, and the rhythm pattern intended by the game programmer is formed, for example. In addition, in a case that a random-selecting method is selected as the selecting method of the rhythm, the three rhythm data 780*a*, 780*b*, 780*b* are selected in appropriate order (randomly), and a plurality of kinds of the rhythm patterns are formed.

Similarly, in a rhythm group 2 (Rhythms02), the rhythm pattern is formed of the rhythm B data 780*b*, the rhythm A data 780*a*, the rhythm C data 780*c*, the rhythm D data 780*d*, and the rhythm B data.

In a case that the sequential-selecting method is selected, similar to the case of the rhythm group 1, each rhythm data is selected from the head in order, and the rhythm pattern intended by the game programmer is formed, for example. On the other hand, in a case that the random-selecting method is selected, similar to the case of the rhythm group 1, the five rhythm data 780*b*, 780*a*, 780*c*, 780*d*, 780*b* are randomly selected, and a plurality of kinds of rhythm patterns are formed.

It is noted that the data stored in the tone color storing area 74, the phrase storing area 76, and the rhythm-pattern storing area 78, similar to the game program, are loaded as required from the optical disk 18 all at once or partially and sequentially.

Returning to FIG. 3, in the flag storing area 80, a fighting flag 80*a*, an array in-small-number flag 80*b*, a physical strength decreasing flag 80*c*, a swing flag 80*d*, a performing period flag 80*e*, and a performance suspended period flag 80*f* are stored. Although not illustrated, each of the flags 80*a*-80*f* is constructed of 1 bit of a register. When established (turned on), a data value of the register is set to "1", and on the contrary, when turned off, the data value of the register is set to "0".

The fighting flag 80*a* is a flag for determining whether or not the game is displaying a scene (fighting scene) in which the player character, etc., fights the enemy character, turned on in the fighting scene, and turned off in other cases. The array in-small-number flag 80*b* is a flag for determining whether or not a companion (friend) character ("PIKMIN" (trademark), for example) that accompanies the player character is equal to or smaller than a predetermined number, and whether one or more character(s) is (are) dead in a certain game stage.

This array in-small-number flag 80*b* is turned on in a case that the PIKMIN is equal to or smaller than the predetermined number and one or more character(s) is (are) dead in the certain game stage, and turned off in other cases. The physical strength decreasing flag 80*c* is a flag for determining whether or not the physical value of the player character is equal to or smaller than a predetermined level, turned on in a case that the physical value of the player character is equal to or smaller than the predetermined level, and turned off in a case that the physical value of the player character exceeds the predetermined level.

The swing flag 80*d* is a flag for determining whether or not to change a counting method of the tempo of the BGM to be performed, turned when changing the counting method of the tempo, and turned off when not changing the method. The performing period flag 80*e* is a flag for determining a performing period of the BGM, turned on when the game is in the performing period of the BGM, and turned off in other cases. In addition, the performance suspended period flag 80*f* is a flag for determining a performance suspended period of the BGM, turned on in a case of being in the performance suspended period of the BGM, and turned off in other cases.

In the counter storing area 82, a plurality of counters are provided, and in this illustrative embodiment, a rhythm step counter 82*a*, a performing period counter 82*b*, a performance suspended period counter 82*c*, and a phrase continuous counter 82*d* are provided. Each of the counters 82*a*-82*d* is constructed of a register, and used in generating and reproducing processes (see FIG. 10-FIG. 16) of the BGM described later, for example.

The phrase-number storing area 84 is an area used in the generating and reproducing processes (see FIG. 10-FIG. 16) of the BGM described later, and stores the number (hereinafter briefly referred to as "phrase number") allotted to the phrase data selected when the BGM data is generated. It is noted that the phrase-number storing area 84*a* may store a name of the phrase data.

It is noted that although not illustrated, in the main memory 40, image data of the game world described above, image data of the character, image data of an object, etc., are stored, and these image data, similar to the game program, are loaded as required from the optical disk 18, all at once or partially and sequentially.

Figure 7:
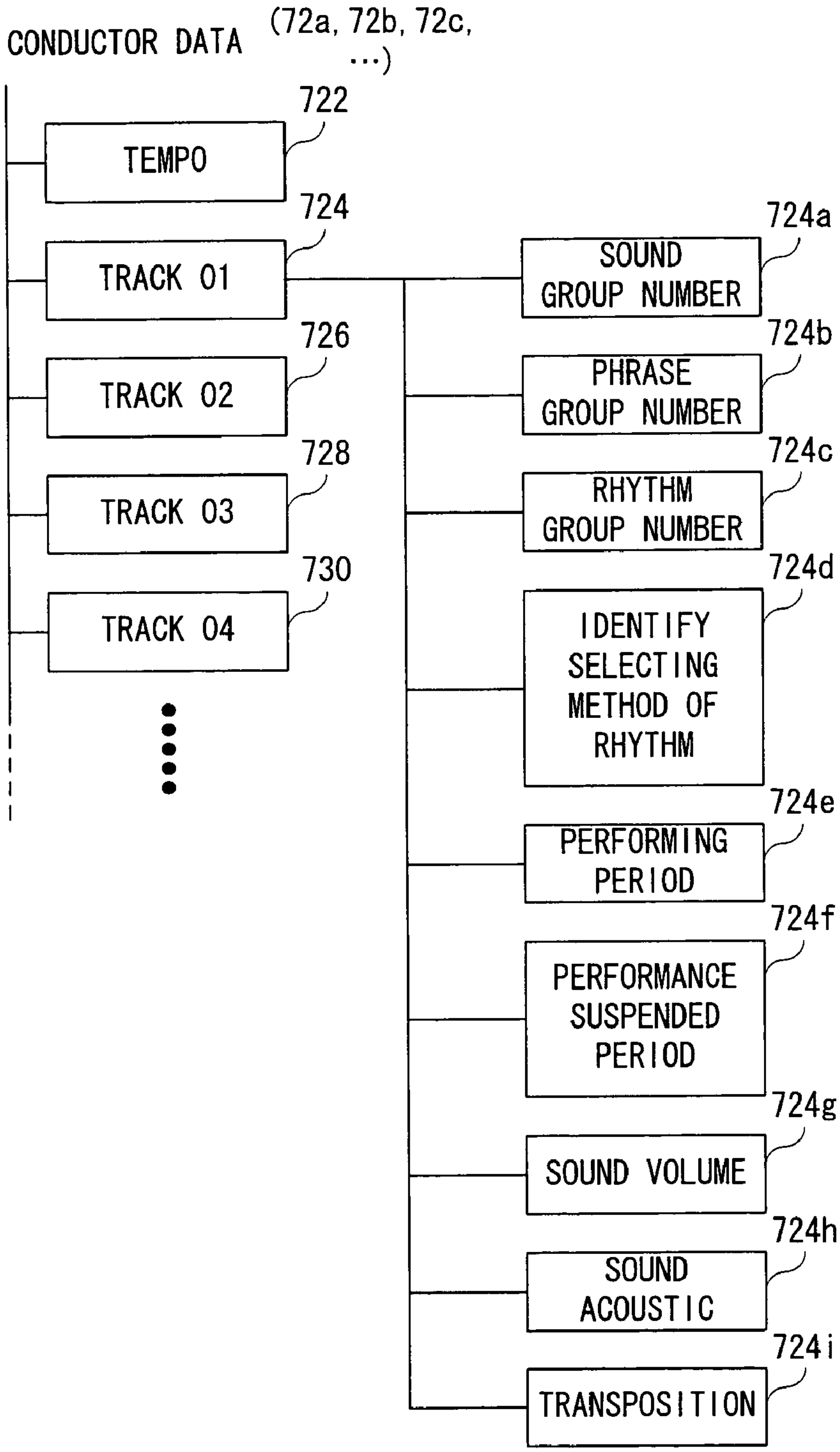
FIG. 7 is an illustrative view showing data structure of conductor data shown in FIG. 3.

FIG. 7 is an illustrative view showing data structure 720 of the conductor data (72*a*, 72*b*, 72*c*, . . . ). Referring to this FIG. 7, as described above, the conductor data (72*a*, 72*b*, 72*c*, . . . ) is constructed of tempo data 722, and a plurality of track data 724, 726, 728, 730, . . . .

The tempo data 722 is data for controlling a performing speed when the musical composition is performed. Herein, the tempo means a speed when the musical composition is performed, and represented using the number (bpm: beat per minutes) of a unit musical tone to be performed in a minute. The quarter note is generally used as the unit musical note. However, another musical note may be used depending on the musical composition. That is, the tempo data 722 is data for defining (designating) at which speed this unit musical note is performed.

Therefore, when the audio data corresponding to the BGM is generated, according to this tempo data 722, similar to a metronome producing a clicking sound, the DSP 52 generates pulse data, including a pulse rendered a high level at a timing that the clicking sound is produced. A pulse width is determined by a length of a beat (unit musical note), and in default tempo data, a time-period interval between the beat on the top, in which the unit musical note exists, and the beat on the bottom, in which no musical note exists, is set to the same interval.

Each of the track data 724, 726, 728, 730 is data representing one or more part(s) (musical instrument, orchestra, and etc.) responsible for performing the musical composition (BGM) based on the conductor data concerned (72*a*, 72*b*, 72*c*, . . . ). This track data 724 (same is true of the track data 726, 728, 730) is constructed of color-tone group number data 724*a*, phrase group number data 724*b*, rhythm group number data 724*c*, rhythm selecting-method identifying data 724*d*, performing period data 724*e*, performance suspended period data 724*f*, sound volume data 724*g*, acoustic data 724*h*, and transposition data 724*i*.

The color-tone group number data 724*a* is data indicating the number (reference number) added to the program (color tone) group (Prog). However, the color-tone group number data 724*a* may be data indicating a name of a color tone group in place of the number (reference number) of the color tone group. Therefore, by referring to this color tone group data 724*a*, it becomes possible to specify the storing area for storing the number of the sound waveform data (Wave_a, Wave_b, Wave_c, . . . ) used for reproducing the track 724.

The phrase group number data 724*b* is data indicating the number (reference number) added to the phrase group (Tips). However, the phrase group number data 724*b* may be data indicating a name of the phrase group in place of the number (reference number) of the phrase group. Therefore, by referring to this phrase group number data 724*b*, it becomes possible to specify the storing area for storing the number of the phrase data used for reproducing the track 724.

The rhythm group number data 724*c* is data indicating the number (reference number) added to the rhythm group (Rhythms). However, the rhythm group number data 724*c* may be data indicating a name of the group in place of the number (reference number) of the rhythm group. Therefore, by referring to this rhythm group number data 724*c*, it becomes possible to specify the storing area for storing the rhythm group (rhythm pattern) used for reproducing the track 724.

The rhythm selecting-method identifying data 724*d* is data for identifying a selecting method of the rhythm data . . . within the selected rhythm group. In this embodiment, there are the two selecting methods, that is, the sequential-selecting method, in which the rhythm data is selected according to the order of a table, and the random-selecting method, in which the rhythm data is randomly selected. By referring to this rhythm selecting-method identifying data 724*d*, it becomes possible to identify the selecting method of the rhythm data used for reproducing the track 724.

The performing period data 724*e* is data for designating (defining) the performing period of the musical composition, and more specifically, is determined by the number of selecting the rhythm data in the selected rhythm group (rhythm pattern). However, to be exact, a manner of counting the number of selecting the rhythm data defers between the sequential-selecting method and the random-selecting method. In the sequential-selecting method, when all the rhythm data included in the selected rhythm pattern are counted, one period (one cycle) is counted. On the other hand, in the random-selecting method, at each time that the rhythm data included in the selected rhythm pattern is selected, one cycle is counted. That is, the performing period data 724*e* is data indicating the number of this cycle.

The performance suspended period data 724*f* is data for designating a performance suspended period of the musical composition, and similar to the performing period data 724*e*, data for indicating the number of selecting the rhythm data in the selected rhythm group (rhythm pattern). However, the difference in the manner of counting the number of selecting times, that is, the cycle, between the sequential-selecting method and the random-selecting method is the same as the case of the performing period data 724*e*. The reason it is also designated by the number of times of rhythm data, referring to the performance suspended period, is selected, is to prevent a deviance of an outputting timing of the sound from occurring when resuming the performance from a performance suspended state.

The sound volume data 724*g* is data indicating a sound volume (volume of the sound). The acoustic data 724*h* is data indicating a largeness of a localization (surround). The transposition data 724*i* is data indicating a width of a transposition (change in key), and data that corresponds to a key signature such as "♭", "#", and etc.

The game in this illustrative embodiment is a game in which the player character, that is, a main character, leads the PIKMIN, that is, the companion (friend) character, and clears various events such as fighting the enemy character, and so forth, to realize a final outcome, for example. In this game, the PIKMIN is a life form having a double characteristic of a plant and an animal, and has on an end portion of its head a sprout extending from a ground. When the player character pulls out the sprout, the PIKMIN becomes part of the companions (array). In addition, there are two player characters, that is, a main character and a sub character, the player operates the controller 22 (operating means 26), and by appropriately exchanging between the main character and the sub character, the player effectively clears the various events.

Briefly, the player character of the main role (hereinafter briefly referred to as "main character"), and the player character of the sub role (hereinafter briefly referred to as "sub character") can act together, and in this case, the array of the PIKMINs follow both the main character and the sub character. In addition, the player separates the main character and the sub character as required, and is able to operate separately. In this case, a divided array of the PIKMINs follow each of the main character and the sub character. Therefore, it is possible for the main character to allow the array of the PIKMINs that follow the main character to fight an enemy character, on the other hand, it is possible for the sub character to allow the array of the PIKMINs that follow the sub character to do a task such as building a bridge.

Furthermore, in the fighting scene, the PIKMIN(s) can be eaten by the enemy character, and thereby, the array of the PIKMINs that follows the main character and the sub character is decreased.

In such an AI action game or a role playing game, generally, the BGM is performed while the game proceeds and the BGM is changed according to a situation of the game, etc. A different BGM is performed when a normal game world is displayed versus when a fight scene is displayed, for example.

However, in the normal role playing game, the same BGM is performed in the same scene (situation) so that the player probably becomes tired of the BGM and loses interest in the game itself.

To prevent this problem, in this illustrative embodiment, the BGM is generated at each time, and even in the same scene, to prevent the same BGM from being performed as much as possible. Thereby, the player is less likely to lose interest in the game.

Figure 8:
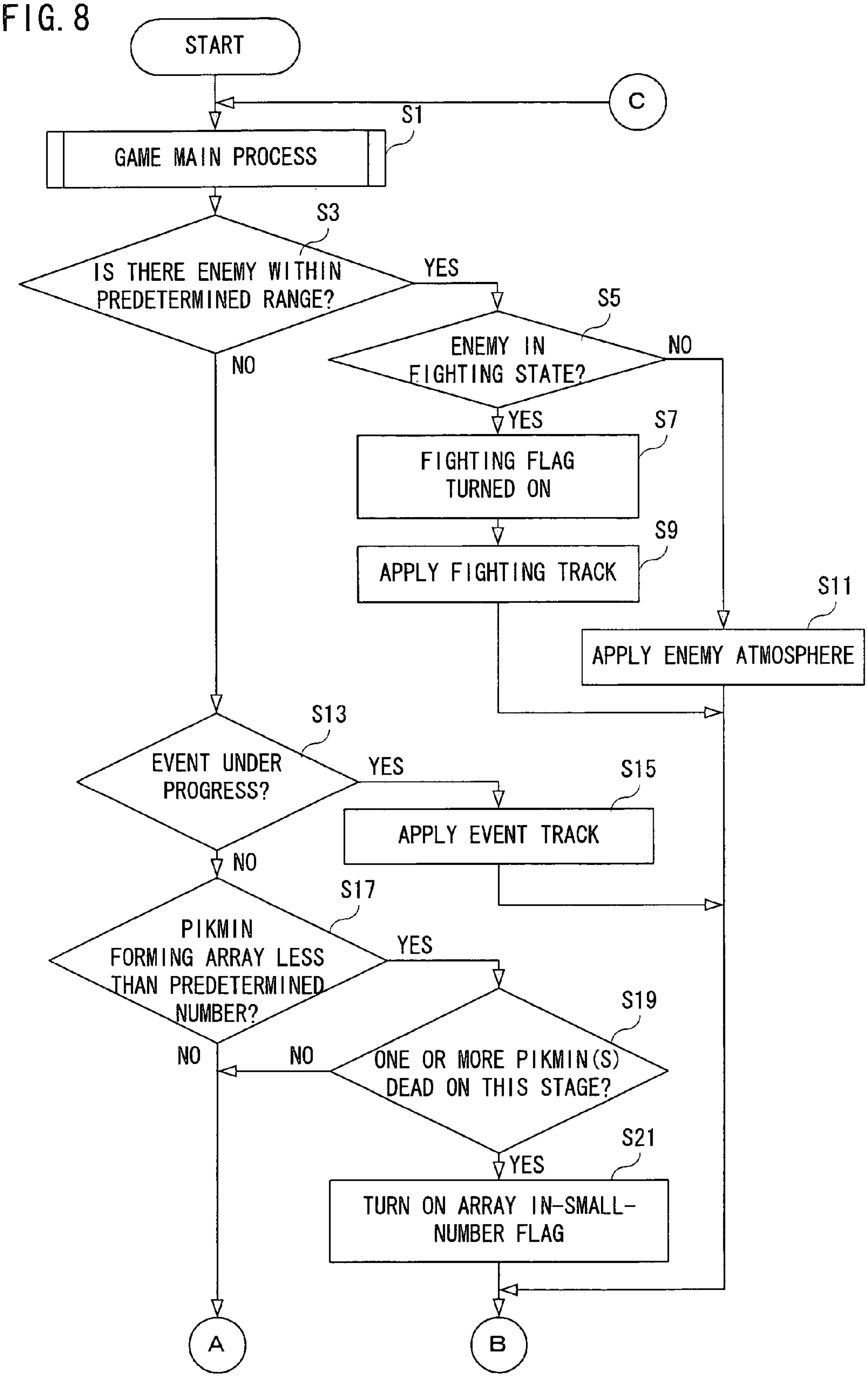
FIG. 8 is a flowchart showing one portion of a game process of a CPU shown in FIG. 2.
Figure 9:
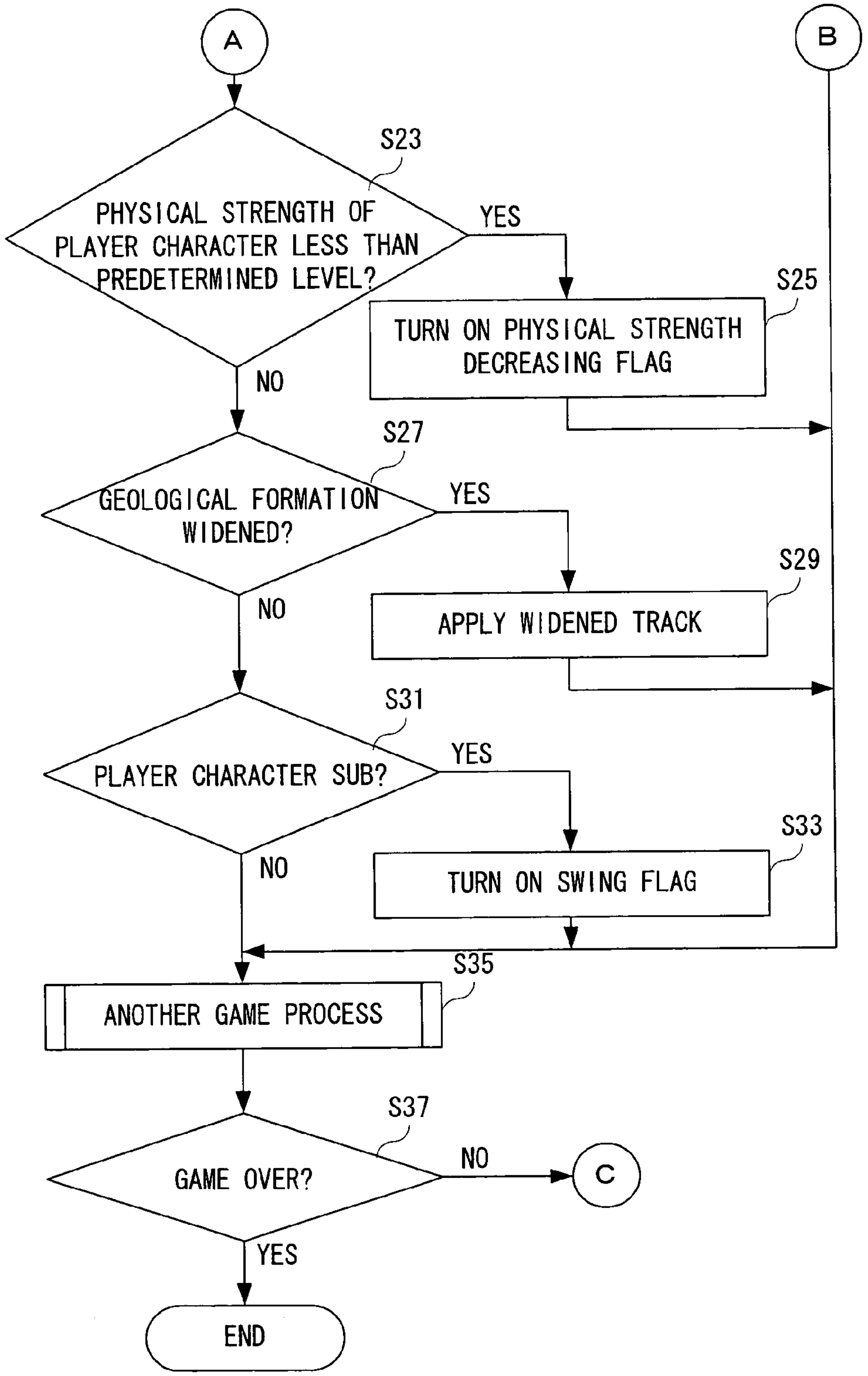
FIG. 9 is a flowchart showing another portion of the game process of the CPU shown in FIG. 2.

More specifically, as a result of the CPU 36, shown in FIG. 2, executing the game program, as shown in FIG. 3, a flowchart shown in FIG. 8 and FIG. 9 is processed. As shown in FIG. 8, when the CPU 36 starts the game process, a game main process is executed in a step S1.

Although detailed descriptions will be omitted, in this step S1, a proceeding of the game is controlled, a game screen corresponding to the proceeding of the game is displayed, a display of the player character and the enemy character is controlled, and so forth. If the player operates the analog joystick (or 3D joystick), out of the operating means 26 of the controller 22, in response thereto, the CPU 36 receives data regarding a slanting direction and a slanting amount of the joystick from the controller I/F 56, and based on this data, changes a location of the player character in the game world (world coordinate system).

In addition, while the game is proceeding, the BGM corresponding to the situation of the game, etc., is performed. In the fighting scene, for example, the conductor data corresponding to the fighting scene is selected, and based on the selected conductor data, the BGM data is generated. In addition, according to an instruction of the CPU 36, the DSP 52 generates the audio data according to the BGM data. The generated BGM data is converted into an audio signal in the audio I/F 62 and then output from the speaker 34*a*. That is, the BGM is performed. This process of generating the output (reproduction) of the BGM will be described later in detail (see FIG. 10-FIG. 16).

In a succeeding step S3, it is determined whether or not the enemy character exists within a predetermined range. If "NO" in this step S3, that is, unless the enemy character exists within the predetermined range, the process directly proceeds to a step S13. On the other hand, if "YES" in the step S3, that is, in a case that the enemy character exists within the predetermined range, it is determined whether or not the enemy character is in a fighting state in a step S5. If "NO" in the step S5, that is, unless the enemy character is in the fighting state, the track (enemy atmosphere track) data for expressing an existence of the enemy character by the sound (music) is added to the conductor data of the BGM currently being performed in a step S11, and the process proceeds to a step S35 shown in FIG. 9.

On the other hand, if "YES" in the step S5, that is, in a case that the enemy character is in the fighting state, the fighting flag 80*a* is turned on in a step S7, and the track (fighting track) data for expressing the fighting scene by the sound (music) is added to the conductor data of the BGM currently being performed, and the process proceeds to the step S35 shown in FIG. 9.

In the step S13, it is determined whether or not an event is in progress. In this embodiment, the event means a state in which a plurality of the PIKMINs carry a thing or the enemy character defeated by the fight, destroy a gate, do a job of securing a path, such as building a bridge, and so forth. If "YES" in the step S13, that is, in a case that the event is under progress, the track (event track) data for expressing that the event is under progress by the sound (music) is added to the conductor data of the BGM currently being performed in a step S15, and the process proceeds to the step S35 shown in FIG. 9.

On the other hand, if "NO" in the step S13, that is, unless the event is in progress, it is determined whether or not the number of the PIKMINs forming the array is equal to or smaller than a predetermined number (30, for example) in a step S17. If "NO" in the step S17, that is, in a case that the number of the PIKMINs forming the array exceeds the predetermined number, the process advances to a step S23 shown in FIG. 9. However, if "YES" in the step S17, that is, in a case that the number of the PIKMINs forming the array is equal to or smaller than the predetermined number, it is determined whether or not one or more PIKIMN(s) is (are) dead in that stage (fighting scene) in a step S19.

If "NO" in the step S19, that is, in a case that no PIKMIN is dead in the stage, the process advances to the step S23 shown in FIG. 9. On the other hand, if "YES" in the step S19, in a case that one or more PIKMIN(s) is (are) dead in the stage, the flag, that is, the array in-small-number flag 80*b*, for determining whether or not the array of the PIKMINs is decreased, is turned on in a step S21, and the process advances to the step S35 shown in FIG. 9.

The reason why, the array in-small-number flag 80*b* is turned on, in a case that the number of the PIKMINs is thus equal to or smaller than the predetermined number, and the PIKMIN(s) is (are) dead on the stage, is to distinguish from a case that the number of the PIKMINs forming the array is equal to or smaller than the predetermined number at a time of starting the game.

As shown in FIG. 9, in the step S23, it is determined whether or not the physical strength of the player character is equal to or smaller than the predetermined level. If "YES" in the step S23, that is, if the physical strength of the player character is equal to or smaller than the predetermined level, the flag, that is, the physical strength decreasing flag 80*c*, for determining that the physical strength of the player character is decreased, is turned on in a step S25, and the process advances to the step S35.

On the other hand, if "NO" in the step S23, that is, in a case that the physical strength of the player character exceeds the predetermined level, it is determined whether or not a geological formation is widened in the game world in a step S27. If "YES" in the step S27, that is, in a case that the geological formation is widened in the game world, track (widened track) data, for expressing by the sound that the geological formation is widened (widening), is added to the conductor data regarding the BGM currently being performed in a step S29, and the process advances to the step S35.

However, if "NO" in the step S27, that is, unless the geological formation is widened in the game world, it is determined whether or not the player character is the sub (sub character) in a step S31. If "NO" in the step S31, that is, if the player character is the main (main character), the process directly advances to the step S35. On the other hand, if "YES" in the step S31, that is, in a case that the player character is the sub character, the flag, that is, the swing flag 80*d*, for determining whether or not to change the counting method of the tempo of the BGM to be performed, is turned on in a step S33, and the process advances to the step S35.

In the step S35, another game process is executed. Another game process includes a back-up (saving) process of the game data generated by the proceeding of the game, etc. In accordance with the proceeding of the game, the game data is written into a work area (not shown) of the main memory 40, and the game data is updated, one after another, for example. Then, when the back-up process is executed according to an instruction of the player and a predetermined event, the game data written in the work area of the main memory 40 is stored in the memory card 30 via the external memory I/F 60 (FIG. 2).

In a succeeding step S37, it is determined whether or not the game is ended. If "NO" in the step S37, that is, unless the game is ended, the process returns to the step S1. On the other hand, if "YES" in the step S37, that is, if the game is ended, the game process is ended.

FIG. 10-FIG. 16 are flowcharts showing the generating and reproducing processes. It is noted that these generating and reproducing processes of the BGM are processes regarding one track, and if two or more track data are included in the conductor data, the same process is simultaneously (in a parallel manner) executed for each track.

Figure 10:
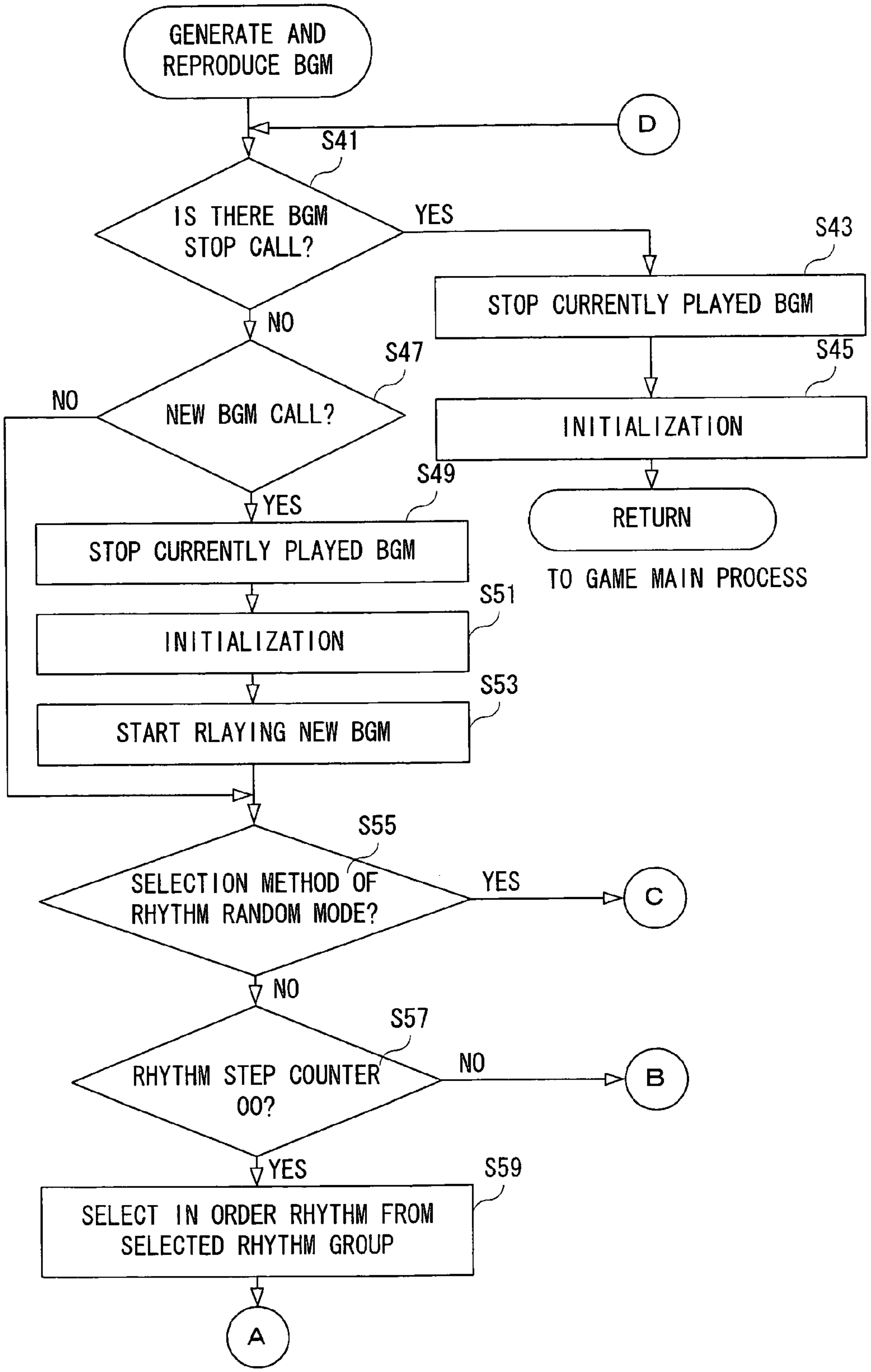
FIG. 10 is a flowchart showing one portion of a BGM generation and a reproduction process of the CPU shown in FIG. 2.

As shown in FIG. 10, when the CPU 36 starts the generating and reproducing processes of the BGM, it is determined whether or not there is a BGM stop call, that is, a suspending instruction (suspending command) of the reproduction in a step S41. If "YES" in the step S41, that is, in a case that there is the BGM stop call, the BGM currently being performed is stopped in a step S43. That is, the reproduction of the BGM data is suspended. Then, an initialization is executed in a step S45, and the generating and reproducing processes are returned, and the process returns to the game main process in the step S1 shown in FIG. 8.

In the initialization process in this step S45, each setting is made as follows: Tips (phrase group number)=00; Rhythms (rhythm group number)=00; rhythm step counter=00; performing period flag=0 (turned off); performing period counter=00; performance suspended period counter=00; phrase number=00; and phrase continuous counter=00.

On the other hand, if "NO" in the step S41, that is, unless there is the BGM stop call, it is determined whether or not there is a new BGM call, that is, a reproduction instruction (reproduction command) of a new BGM, in a step S47. If "NO" in the step S47, that is, unless there is the new BGM call, the process directly advances to a step S55. On the other hand, if "YES" in the step S47, the BGM currently being performed is stopped in a step S49, the initialization is executed in a step S51, the reproduction of the new BGM is started in a step S53, and the process advances to the step S55.

In the initialization in the step S51, each setting is made as follows: Tips (phrase group number)=designated value; Rhythms (rhythm group number)=designated value; the rhythm step counter=00; the performing period flag=1 (turned on); the performing period counter=designated value; performance suspended period counter=designated value; phrase number=00; and phrase continuous counter=00.

Herein, the designated value means a value designated by the conductor data. Therefore, a value (number) shown by the phrase group number data (724*b*) is set to the Tips, a value (number) shown by the rhythm group number data (724*c*) is set to the Rhythms, a value shown by the performing period data (724*e*) is set to the performing period counter 82*b*, and a value shown by the performance suspended period data (724*f*) is set to the performance suspended period counter 82*c*.

In the step S55, it is determined whether or not the selecting method of the rhythm is a random mode (random selecting method). More specifically, it is determined whether the selecting method is the sequential-selecting method or the random-selecting method based on the rhythm selecting method identifying data (724*d*), included in the track data (724). If "YES" in the step S55, that is, if the selecting method is the random-selecting method, the process advances to a step S129 in FIG. 14.

On the other hand, if "NO" in the step S55, that is, if the selecting method is the sequential-selecting method, it is determined whether or not a count value of the rhythm step counter 82*a* is "00" in a step S57. If "NO" in the step S57, that is, unless the count value of the rhythm step counter 82*a* is "00", the process advances to a step S103 shown in FIG. 13. On the other hand, if "YES" in the step S57, that is, if the count value of the rhythm step counter 82*a* is "00", the rhythm is selected in order from the selected rhythm group in a step S59. That is, one rhythm group storing area is selected according to the rhythm group number data (724*c*) included in the track data (724), and the rhythm data stored in this selected rhythm group storing area is selected in order from a head. In this embodiment, for example, in the rhythm group storing area shown in FIG. 4 (C), the rhythm data is selected in descending order.

Figure 11:
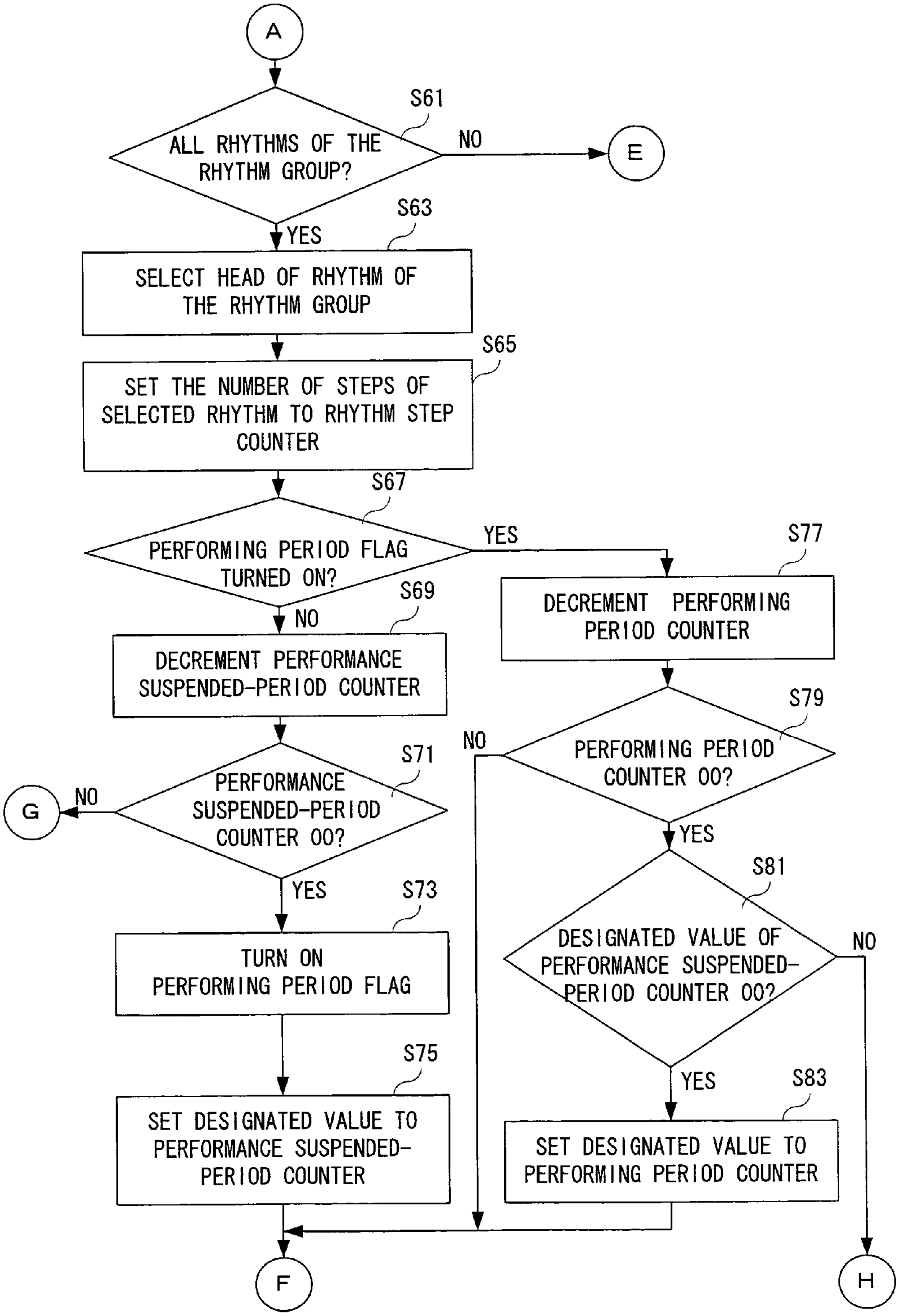
FIG. 11 is a flowchart showing another portion of the BGM generation and the reproduction process of the CPU shown in FIG. 2.

In a succeeding step S61 as shown in FIG. 11, it is determined whether or not all the rhythms of the rhythm group are selected. That is, it is determined whether or not the rhythm group selected last time is the rearmost rhythm data of the group storing area. If "NO" in the step S61, that is, unless all the rhythms of the rhythm group are selected, the process advances to a step S85 shown in FIG. 12. On the other hand, if "YES" in the step S61, that is, if all the rhythms of the rhythm group are selected, a head rhythm of the rhythm group is selected in a step S63, and the number of steps of the selected rhythm (rhythm data) is set to the rhythm step counter 82*a* in a step S65.

Herein, the number of steps means the number of steps of the selected musical note (rhythm) when the musical note (in this embodiment, the sixteenth note) of a previously determined (predetermined) reference is the minimum unit (in this embodiment, 30 steps). Therefore, when the selected rhythm data corresponds to the quarter note, for example, "120" is set as the number of steps, or, when the selected rhythm data corresponds to the eighth note, "60" is set as the number of steps. Hereinafter, the same is true.

In a succeeding step S67, it is determined whether or not the performing period flag 80*e* is turned on. If "NO" in the step S67, that is, if the performing period flag 80*e* is turned off, the performance suspended period counter 82*c* is decremented in a step S69, determining that it is the performance suspended period, and it is determined whether or not the counter value of the performance suspended period counter 82*c* is "00" in a step S71.

Figure 12:
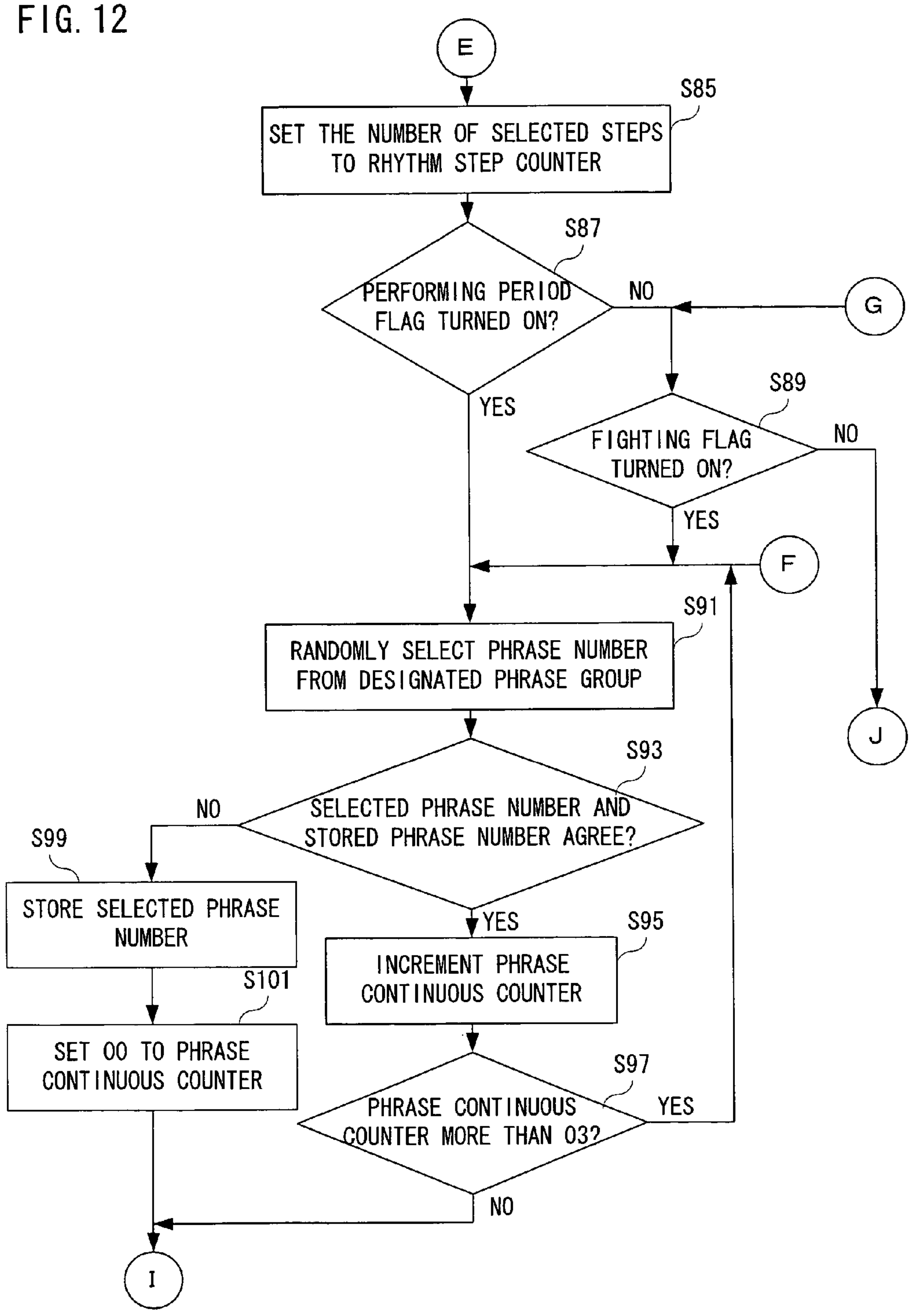
FIG. 12 is a flowchart showing still another portion of the BGM generation and the reproduction process of the CPU shown in FIG. 2.

If "NO" in the step S71, that is, unless the count value of the performance suspended period counter 82*c* is "00", the process advances to a step S89 in FIG. 12. On the other hand, if "YES" in the step S71, that is, if the count value of the performance suspended period counter 82*c* is "00", the performing period flag 80*e* is turned on in a step S73, the designated value is set to the performance suspended period counter 82*c* in a succeeding step S75, and the process advances to a step S91 shown in FIG. 12.

In addition, if "YES" in the step S67, that is, if the performing period flag 80*e* is turned on, the performing period counter 82*b* is decremented in a step S77, determining that it is the performing period, and it is determined whether or not the count value of the performing period counter 82*b* is "00" in a step S79. If "NO" in the step S79, that is, unless the count value of the performing period counter 82*b* is "00", the process directly advances to a step S91 shown in FIG. 12. However, if "YES" in the step S79, that is, when the count value of the performing period counter 82*b* is "00", it is determined whether or not the designated value of the performance suspended period counter 82*c* is "00" in a step S81.

Figure 13:
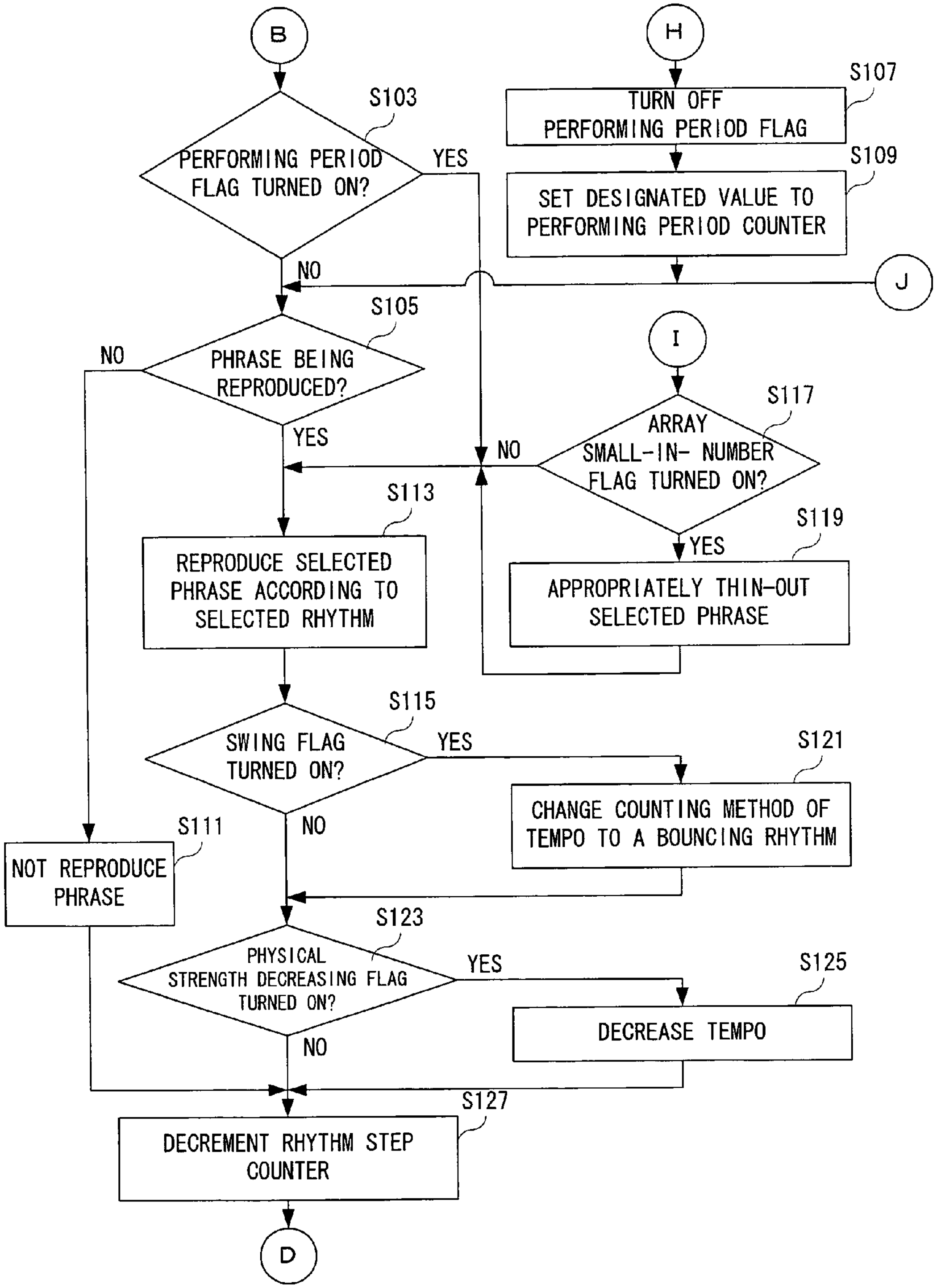
FIG. 13 is a flowchart showing yet still another portion of the BGM generation and the reproduction process of the CPU shown in FIG. 2.

If "NO" in the step S81, unless the designated value of the performance suspended period counter 82*c* is "00", the process advances to a step S107 shown in FIG. 13, determining that there is the performance suspended period. On the other hand, if "YES" in the step S81, that is, if the designated value of the performance suspended period counter 82*c* is "00", the designated value is set to the performing period counter 82*b* in a step S83, determining that there is no performance suspended period, and the process advances to the step S91 shown in FIG. 12.

As described above, in the step S61 in FIG. 11, if it is determined that all the rhythms of the rhythm group are not selected, as shown in FIG. 12, in a step S85, the number of steps of the selected rhythm is set to the rhythm step counter 82*a*. In a succeeding step S87, it is determined whether or not the performing period flag 80*e* is turned on. If "YES" in the step S87, that is, if the performing period flag 80*e* is turned on, the process directly advances to the step S91. However, if "NO" in the step S87, that is, if the performing period flag 80*e* is turned off, it is determined whether or not the fighting flag 80*a* is turned on in a step S89.

If "NO" in the step S89, that is, if the fighting flag 80*a* is turned off, the process advances to a step S105 shown in FIG. 13. On the other hand, if "YES" in the step S89, that is, if the fighting flag 80*a* is turned on, the process advances to the step S91. Thus, even if the performing period flag 80*e* is turned off, if the fighting flag 80*a* is turned on, the process advances to the step S91 so as to forcedly perform the BGM in the fighting scene, and ignore the performance suspended period flag 80*f*.

In the step S91, the phrase is selected randomly (appropriately) from the designated phrase group. That is, one phrase group is selected according to the phrase group number (724*b*) included in the track data (724), and the phrase number, stored in the storing area of the selected phrase group, is randomly selected, by a random number, for example. Furthermore, the phrase data, indicated by the phrase number randomly selected, is read out (selected) from the phrase data storing area 770. In a succeeding step S93, it is determined whether or not the selected phrase number and the phrase number stored in the phrase-number storing area 84 agree. That is, it is determined whether or not the phrase data selected last time and the phrase data selected this time are the same.

If "YES" in the step S93, is, if the selected phrase number and the stored phrase number agree, the phrase continuous counter 82*d* is incremented in a step S95, and it is determined whether or not the count value of the phrase continuous counter 82*d* is equal to or more than "03" in a step S97. That is, it is determined whether or not the same phrase data is continuously selected three times. If "NO" in the step S97, that is, in a case that the count value of the phrase continuous counter 82*d* is less than "03", the process directly advances to a step S117 shown in FIG. 13. On the other hand, if "YES" in the step S97, that is, if the count value of the phrase continuous counter 82*d* is equal to or more than "03", the process returns to the step S91, determining that the same phrase data is continuously selected for three times. That is, in a case that the same phrase data is continuously selected three times, the phrase data is re-selected, and the same phrase data is prevented from being continuously performed three or more times. Thereby, the BGM is prevented from becoming monotonous.

On the other hand, if "NO" in the step S93, that is, unless the selected phrase number and the stored phrase number agree, the selected phrase number is stored (overwritten) into the phrase-number storing area 84 of the main memory 40, and the count value of the phrase continuous counter 82*d* is set (reset) to "00" in a step S101, and the process advances to the step S117 shown in FIG. 13.

As described above, if it is determined that the count value of the rhythm step counter 82*a* is "00" in the step S57 in FIG. 10, it is determined, in a step S103, whether or not the performing period flag 80*e* is turned on as shown in FIG. 13. If "YES" in the step S103, that is, if the performing period flag 80*e* is turned on, the process directly advances to a step S113, having determined that it is the performing period. On the other hand, if "NO" in the step S103, that is, if the performing period flag 80 is turned off, the process advances to a step S105, having determined that it is the performance suspended period.

In addition, as described above, in the step S81 in FIG. 11, if determined that the designated value of the performance suspended period counter 82*c* is not "00", the performing period flag 80*e* is turned off, in the step S107, as shown in FIG. 13, the designated value is set to the performing period counter 82*b*, in a step S109, and the process advances to the step S105.

In the step S105, it is determined whether or not the phrase is being reproduced. If "NO" in the step S105, that is, unless the phrase is being reproduced, the phrase is not reproduced, that is, the reproduction of the phrase is suspended in a step S111, and the process advances to a step S127. On the other hand, if "YES" in the step S105, that is, if the phrase is being reproduced, the selected phrase is reproduced according to the selected rhythm data in a step S113, and the process advances to a step S115.

Figure 17:
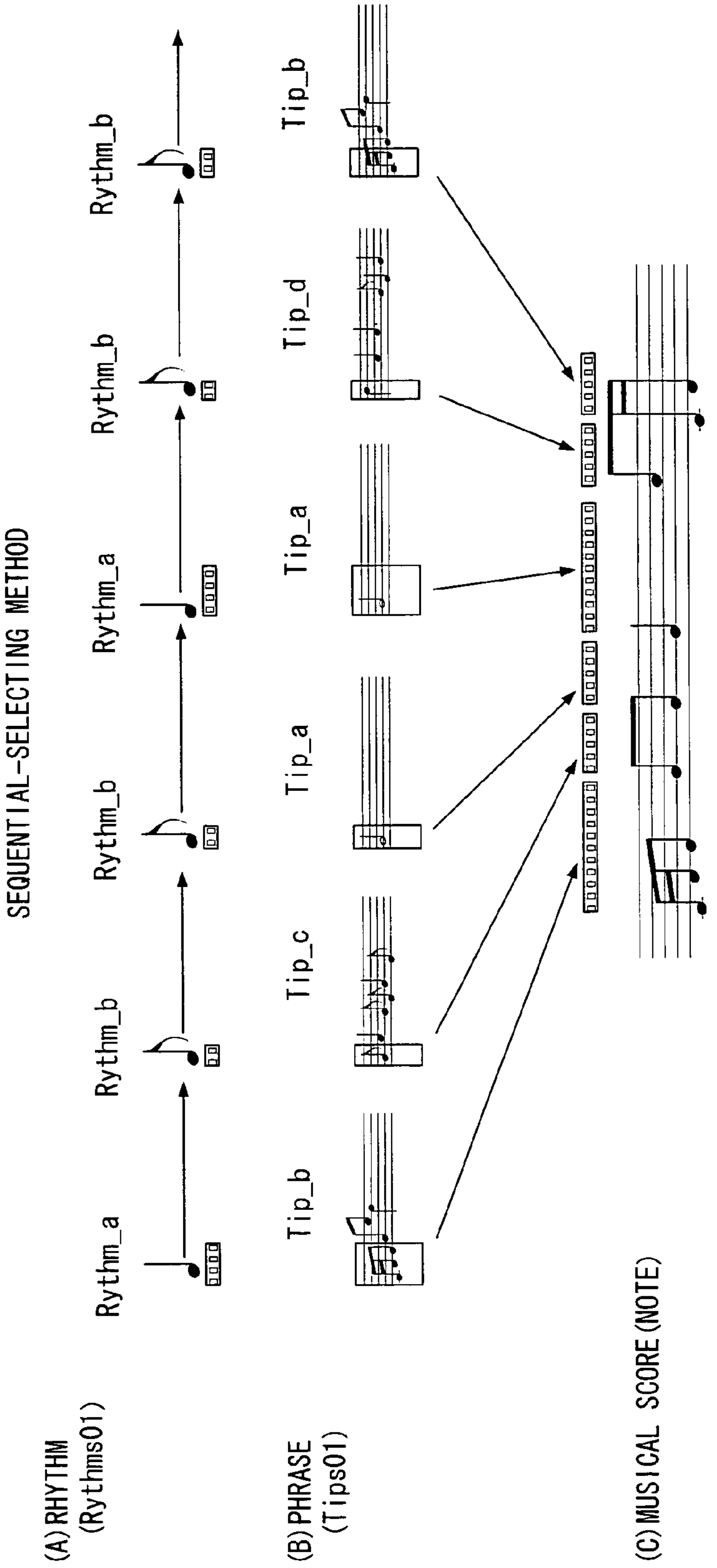
FIG. 17 is an illustrative view showing a generating method of a BGM in a case of selecting a rhythm in a sequentially selecting method.

FIG. 17 is an illustrative view for describing a method of generating the BGM (musical score) to be performed in a case that the sequential-selecting method is selected as the selecting method of the rhythm. As shown in FIG. 17 (A), if the rhythm group 1 (Rhythms01) is selected, in the sequential-selecting method, the rhythm data is repeatedly selected in the order of the rhythm A data (Rhythm_a) 780*a*, the rhythm B data (Rhythm_b) 780*b*, and the rhythm B data (Rhythm_b), for example.

Furthermore, if the phrase group 1 (Tips01) is selected, for example, as described above, the phrase number included in this phrase group 1 is randomly selected. Then, the phrase data indicated by the selected phrase number is selected. Herein, as shown in FIG. 17 (B), it is provided that the phrase is selected in the order of the phrase B data (Tip_b) 770*b*, the phrase C data (Tip_c) 770*c*, the phrase A data (Tip_a) 770*a*, the phrase A data (Tip_a) 770*a*, the phrase D data (Tip_d) 770*d*, and the phrase B data (Tip_b) 770*b*, for example.

Each of the rhythm data (musical tone) shown in FIG. 17 (A) corresponds to the phrase data (phrase) shown in FIG. 17 (B). Furthermore, as described above, the rhythm data defines the length of the performance and the pronunciation timing for performing the phrase data so that each of the phrases has one of its portion extracted according to the corresponding rhythm, and the musical score (note) as shown in FIG. 17 (C) is generated.

That is, the phrase B data 770*b* that corresponds to the initial (first) rhythm A data 780*a* is extracted by the length equal to the quarter note that corresponds to the rhythm A data 780*a*. That is, the first sixteenth note, the second sixteenth note, and the third sixteenth note that correspond to the phrase B data 770*b* are extracted.

It is noted that in FIG. 17 (B), in order for the extracted phrase to be easily understood, one portion of the phrase is surrounded by a square frame. In addition, in FIG. 17 (C), the length of the sound of the musical note that corresponds to the rhythm data, and the length of the extracted phrase are illustrated in a relative manner using a bar graph. Hereinafter, the same is true.

In the phrase C data 770*c* that corresponds to the second rhythm B data 780*b*, the first eighth note is extracted. The phrase A data 770*a* that corresponds to the third rhythm B data 780*b* is a phrase constructed of one musical note (half note) so that the sound indicated by the half note is extracted by the length equal to the eighth note that corresponds to the rhythm B data 780*b*. In the phrase A data 770*a* that corresponds to the fourth rhythm A data 780*a*, too, the sound indicated by the half note is extracted by the length of the quarter note that corresponds to the rhythm A data 780*a*. In the phrase D data 770*d* that corresponds to the fifth rhythm B data 780*b*, the sound indicated by the first quarter note is extracted by the length equal to the eighth note that corresponds to the rhythm B data 780*b*. In addition, in the phrase B data 770*b* that corresponds to the sixth rhythm B data 780*b*, the first sixteenth note and the second sixteenth note are extracted.

Therefore, the musical score as shown in FIG. 17 (C) is generated. The data that corresponds to this musical score is the BGM data. However, as described above, in this generation/reproduction process of the BGM, the process relates to one track, but in a case that the conductor data includes two or more track data, the BGM data generated in each track can be collectively referred to as the BGM data.

The CPU 36 reproduces this BGM data according to the tempo data (722) included in the conductor data (720), and designates the color tone data (sound waveform data) indicated by the color-tone group number data 724*a* included in the track data (724), the sound volume (volume of the sound) indicated by the sound volume data (724*g*), and a volume of an acoustic sound indicated by the acoustic data (724*h*). That is, the BGM data according to the tempo data 722 is applied to the DSP 52, and the color tone data, sound volume data, and acoustic data to be used are applied (designated). The DSP 52 generates the audio data of the BGM data according thereto. This audio data is output from the speaker 34*a* via the audio I/F 62. That is, the BGM is performed (reproduced).

It is noted that in an example shown in FIG. 17, a state in which each of the rhythm data and the phrase data is selected for six times is displayed, and at each time that the rhythm data and the phrase data are selected once, the phrase according to the selected rhythm is reproduced. If the phrase equal to the length designated by the rhythm is reproduced, the succeeding rhythm data and the phrase data are selected. As a result of such a process being repeated, the BGM is reproduced.

Figure 18:
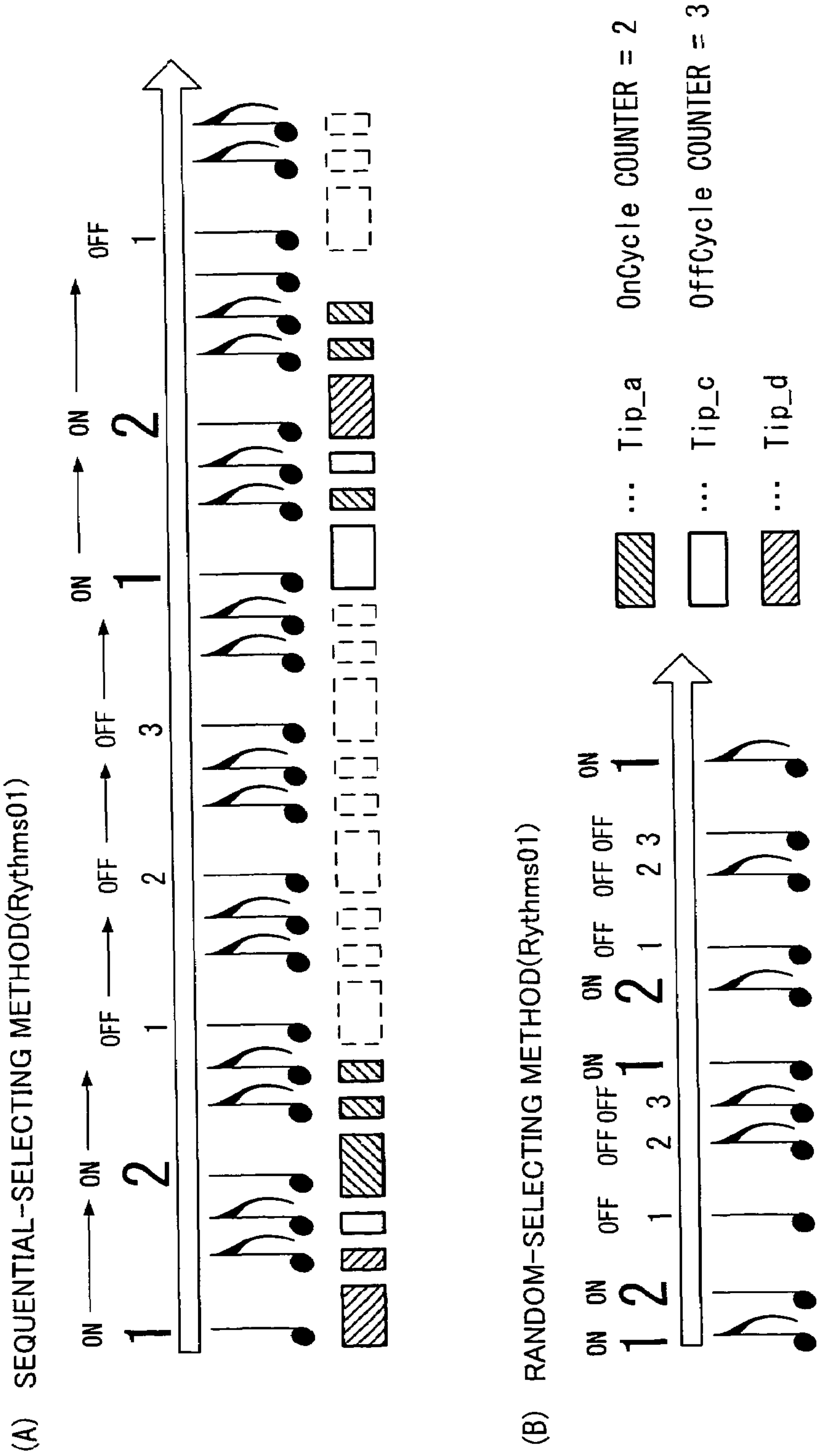
FIG. 18 is an illustrative view showing a performing method of the BGM in a case that a performing period and a performance suspending period are defined.

In addition, FIG. 18 is an illustrative view for describing a performing method of a case where the performing period and the performance suspended period are defined (designated). The example shown in this FIG. 18 describes a case where the rhythm group 1 (Rhythms01) is selected, the phrase group 2 (Tips02) is selected, the designated value "02" is set to a performing period (OnCycle) counter 82*b*, and the designated value "03" is set to a performance suspended period (OffCycle) counter 82*c*.

As shown in FIG. 18 (A), if the sequential-selecting method is selected as the selecting method of the rhythm, as described above, the rhythm data is sequentially selected, and the phrase data is randomly selected. It is noted that in FIG. 18, for the sake of simplicity, the phrase is shown by the square frame and a pattern (dotted line or white-out) within the frame. In addition, the length (width) of the square frame corresponds to the extracted phrase, and the square frame indicated by the dotted line indicates that the performance is suspended.

As described above, if the sequential-selecting manner is selected, one period (one cycle) is counted when all the rhythm data constructing the rhythm pattern are selected. Therefore, when the designated value "02" is set to the performing period counter 82*b*, this performing period counter 82*b* is decremented when all of the rhythm A data 780*a*, the rhythm B data 780*b*, and the rhythm B data 780*b* that constructs the rhythm pattern are selected. That is, the performing period counter 82*b* is decremented at each time that the rhythm pattern is selected, and when the count value of the performing period counter 82*b* becomes "00", the performance is suspended. When the performance is suspended, the designated value "03" is set to the performance suspended period counter 82*c*, and this performance suspended period counter 82*c* is decremented when all the rhythm A data 780*a*, the rhythm B data 780*b*, and the rhythm B data 780*b* that construct the rhythm pattern have been selected. That is, the performance suspended period counter 82*c* is decremented at each time that the rhythm pattern is selected, and when the count value of the performance suspended period counter 82*c* becomes "00", the performance is started (resumed). That is, a state is returned (moved) to a performing state from the performance suspended state.

That is, as a result of the number of selecting times of the rhythm pattern (all rhythm data) being counted, the performing period and the performance suspended period are measured (counted) so that even if the state is moved from the performance suspended state to the performing state, no deviance is occurred to the timing of pronouncing the phrase.

It is noted that in this illustrative embodiment, in the performance suspended period, by masking the phrase data, the sound is not output.

Returning to FIG. 13, as described above, in the step S97 in FIG. 12, if it is determined that the count value of the phrase continuous counter 82*d* is less than "03", that "00" is set to the phrase continuous counter 82*d* in the step S101 in the same FIG. 12, and so forth, it is determined whether or not the array in-small-number flag 80*b* is turned on, in the step S117, as shown in this FIG. 13. If "NO" in the step S117, that is, if the array in-small-number flag 80*b* is turned off, the process advances to the step S113. On the other hand, if "YES" in the step S117, that is, if the array in-small-number flag 80*b* is turned on, one portion of the selected phrase is appropriately thinned out in a step S119, and the process advances to the step S113. That is, by performing the phrase with one portion of the sound deleted, the player is informed by the sound that the number of PIKMIN in the array is small. If one portion of the phrase data is masked, it is possible to thin out one portion of the phrase, for example.

It is determined whether or not the swing flag 80*d* is turned on in the step S115. If "YES" in the step S115, that is, if the swing flag 80*d* is turned on, the counting method of the tempo is changed (swung) to a bouncing rhythm in a step S121, and the process advances to a step S123. As described above, in this illustrative embodiment, the default tempo is determined in advance by the number of unit musical notes performed in one minute, and a time-period interval between the top of the beat and the bottom of the beat is set to the same interval. However, in the step S121, a change is made in such a manner that the time-period interval between the top of the beat and the bottom of the beat has a ratio of 3:1. Thereby, the BGM is performed in a rhythm as if to bounce.

Figure 19:
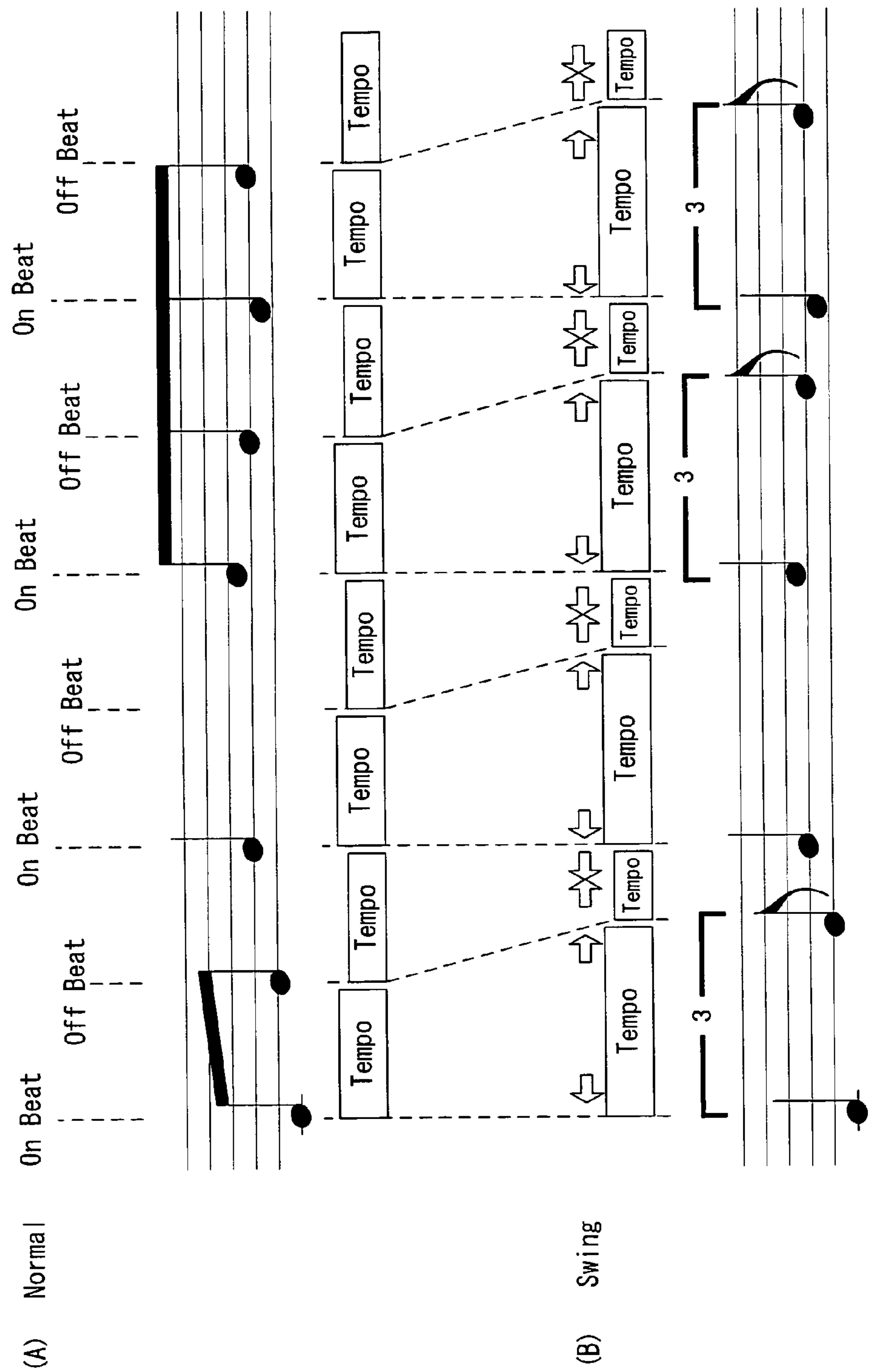
FIG. 19 is an illustrative view showing the performing method of the BGM at a normal tempo and a swing tempo.

More specifically, as shown in FIG. 19 (A), in the default tempo (Normal), the generated musical score, that is, the BGM, is performed at the same time-period intervals (at a ratio of 1:1) between the top of the beat (On Beat) and the bottom of the beat (Off Beat). On the other hand, as shown in FIG. 19 (B), in a case of swinging, the counting method of the tempo is changed in such a manner that the time-period intervals between a period of the On Beat and a period of the Off Beat is rendered at a ratio of 3:1, that is, a pulse width of the pulse data generated by the DSP 52 is changed, and the BGM is performed according to the changed tempo. In addition, as understood from FIG. 19 (A) and FIG. 19 (B), if the counting method of the tempo is changed, one portion of the musical tone (length of the sound, to be exact) is changed. This is due to a fact that the ratio of the time-period intervals is changed between the period of the On Beat and the period of Off Beat.

Thus, by changing the counting method of the tempo, the player can easily determine whether the player character currently operated is the main character or the sub character, not only by the game screen, but also by the BGM to be performed. Hereinafter, the same is true.

Returning to FIG. 13, in the step S123, it is determined whether or not the physical strength decreasing flag 80*c* is turned on. If "NO" in the step S123, that is, if the physical strength decreasing flag 80*c* is turned off, the process directly advances to a step S127. However, if "YES" in the step S123, that is, if the physical strength decreasing flag 80*c* is turned on, the tempo is decreased in a step S125, and the process advances to the step S127. In the step S125, the tempo is changed in such a manner that the number of the unit musical tones to be performed in one minute is rendered half the default tempo, for example. However, the time-period interval between the top of the beat and the bottom of the beat is the same interval. That is, by extending the default tempo data equally in a time-period axis direction, the performing speed is slowed. Hereinafter, the same is true.

In the step S127, the rhythm step counter 82*a* is decremented, and the process returns to the step S41 shown in FIG. 10. That is, until the count value of the rhythm step counter 82*a* is rendered "00", the selected phrase is reproduced according to the selected rhythm, and when the count value of the rhythm counter 82*a* is rendered "00", a succeeding rhythm is selected, and the succeeding phrase is randomly selected.

Figure 14:
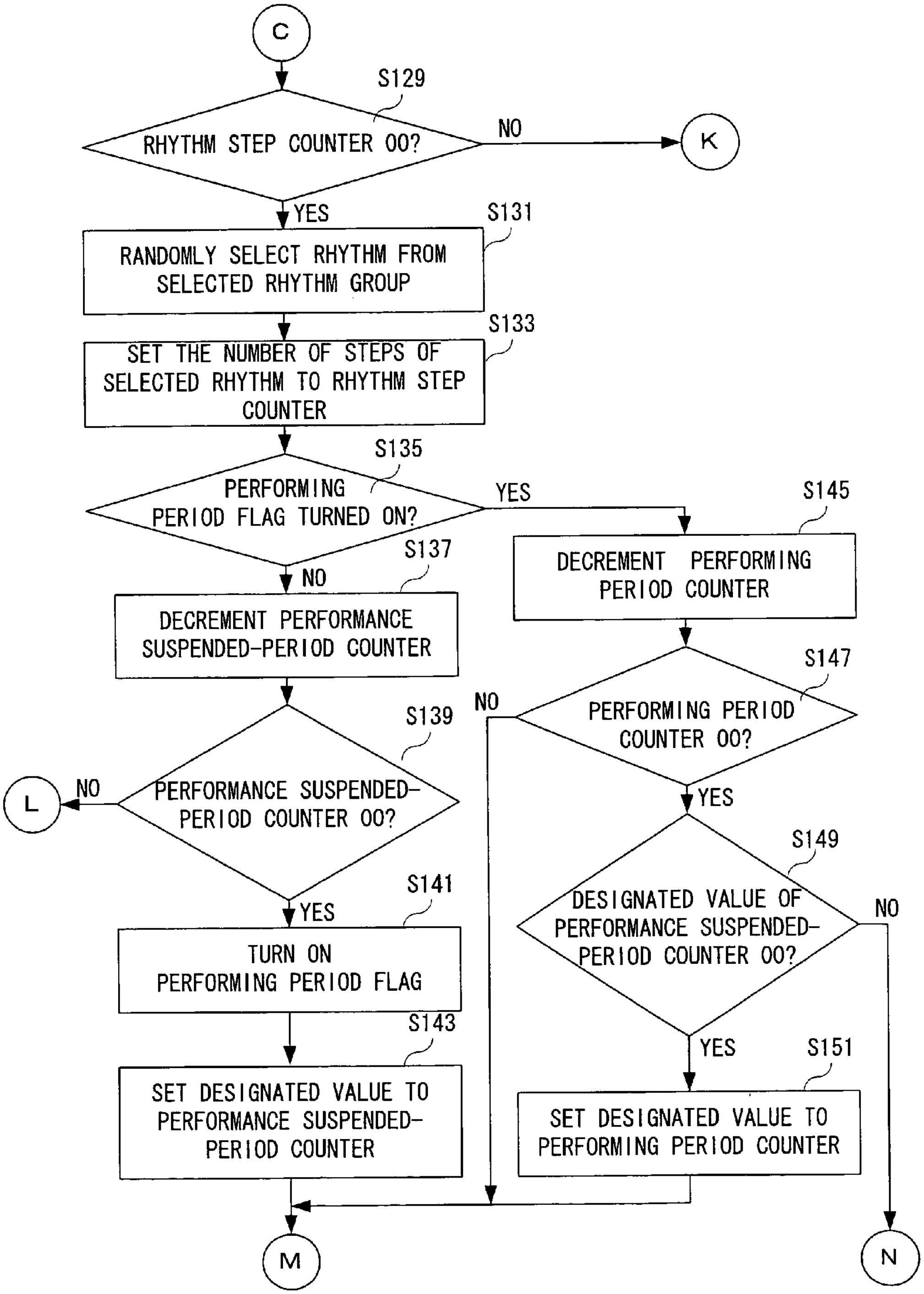
FIG. 14 is a flowchart showing another portion of the BGM generation and the reproduction process of the CPU shown in FIG. 2.

As described above, in the step S55 in FIG. 10, if it is determined that the selecting method of the rhythm is the random-selecting method, it is determined whether or not the count value of the rhythm step counter 82*a* is "00" in a step S129 as shown in FIG. 14. If "NO" in the step S129, that is, unless the count value of the rhythm step counter 82*a* is "00", the process advances to the step S171 shown in FIG. 16. On the other hand, if "YES" in the step S129, that is, if the count value of the rhythm step counter 82*a* is "00", the rhythm (rhythm data) is randomly selected from the storing area of the selected rhythm group in a step S131, and the number of steps of the selected rhythm is set to the rhythm step counter 82*a*, in a step S133.

In a succeeding step S135, it is determined whether or not the performing period flag 80*e* is turned on. If "NO" in the step S135, that is, if the performing period flag 80*e* is turned off, the performance suspended period counter 82*c* is decremented in a step S137, and it is determined whether or not the count value of the performance suspended period counter 82*c* is "00" in a step S139. If "NO" in the step S139, that is, unless the count value of the performance suspended period counter 82*c* is "00", the process advances to a step S153 shown in FIG. 15. On the other hand, if "YES" in the step S139, that is, if the count value of the performance suspended period counter 82*c* is "00", the performing period flag 80*e* is turned on in a step S141, and after the designated value is set to the performance suspended period counter 82*c* in a step S143, the process advances to a step S155 shown in FIG. 15.

On the other hand, if "YES" in the step S135, that is, if the performing period flag 80*e* is turned on, the performing period counter 82*b* is decremented in a step S145, and it is determined whether or not the count value of the performing period counter 82*b* is "00" in a step S147.

Figure 15:
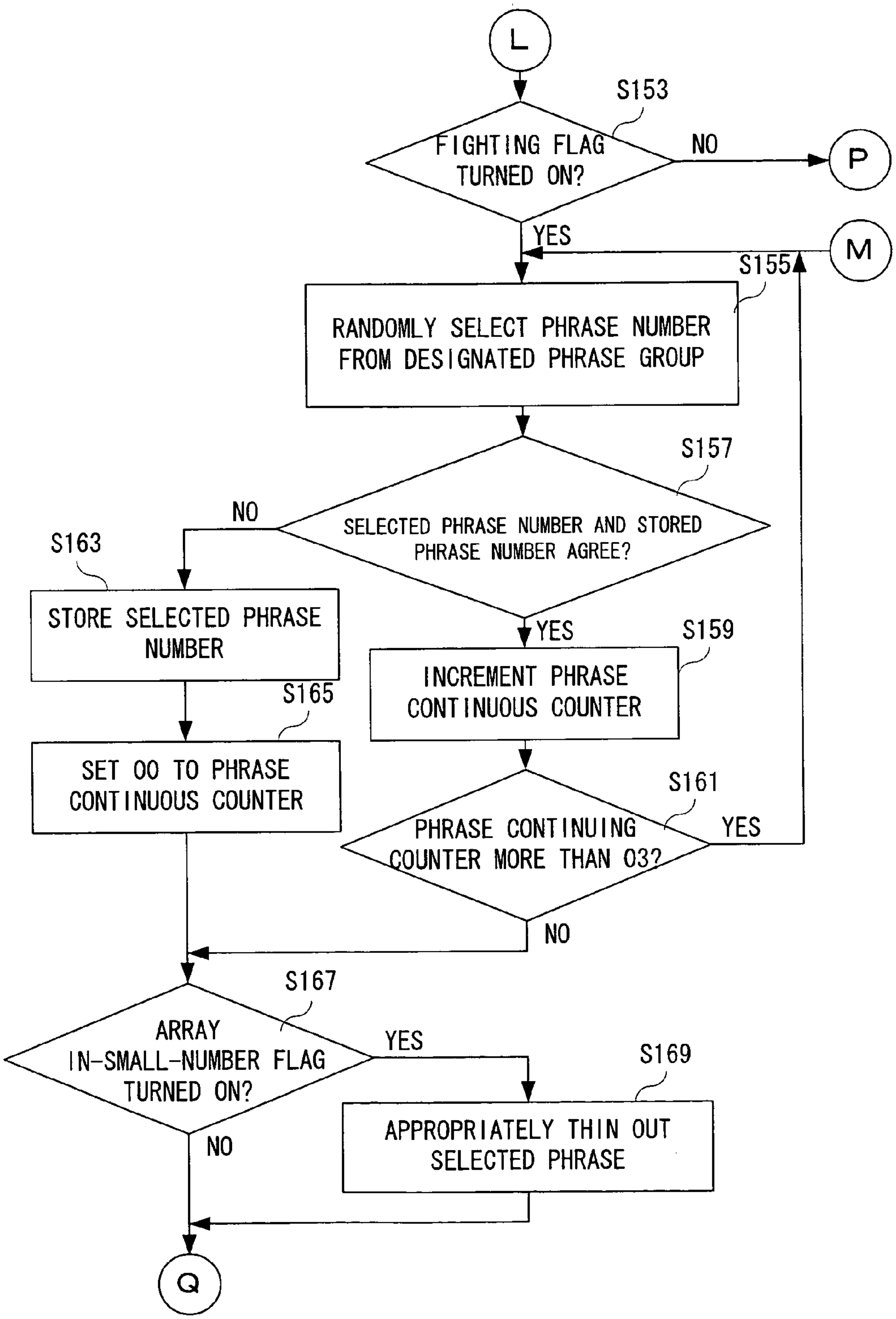
FIG. 15 is a flowchart showing still another portion of the BGM generation and the reproduction process of the CPU shown in FIG. 2.

If "NO" in the step S147, that is, unless the count value of the performing period counter 82*b* is "00", the process directly advances to the step S155 shown in FIG. 15. On the other hand, if "YES" in the step S147, that is, if the count value of the performing period counter 82*b* is "00", it is determined whether or not the designated value of the performance suspended period counter 82*c* is "00". If "NO" in the step S149, that is, unless the designated value of the performance suspended period counter 82*c* is "00", the process advances to a step S175 shown in FIG. 16, determining that there is the performance suspended period. On the other hand, if "YES" in the step S149, that is, if the designated value of the performance suspended period counter 82*c* is "00", after the designated value is set to the performing period counter 82*b* in a step S151, determining that there is no performance suspended period, and the process advances to the step S155 shown in FIG. 15.

As described above, unless it is determined that the count value of the performance suspended period counter 82*c* is "00," in the step S139 in FIG. 14, it is determined whether or not the fighting flag 80*a* is turned on, in a step S153, as shown in FIG. 15. If "NO" in the step S153, that is, unless the fighting flag 80*a* is turned on, the process advances to a step S173 shown in FIG. 16. On the other hand, if "YES" in the step S153, that is, if the fighting flag 80*a* is turned on, the phrase number is randomly selected from the designated (selected) phrase group in a step S155, the phrase data indicated by the selected phrase number is read out (selected) from the phrase data storing area 770.

In a succeeding step S157, it is determined whether or not the selected phrase number and the phrase number stored in the phrase-number storing area 84 agree. That is, it is determined whether or not the same phrase data is selected continuously. If "YES" in the step S157, that is, if the selected phrase number and the stored phrase number agree, the phrase continuous counter 82*d* is incremented in a step S159, determining that the same phrase data has been continuously selected. Then, in a step S161, it is determined whether or not the count value of the phrase continuous counter 82*d* is equal to or greater than "03".

If "YES" in the step S161, that is, if the count value of the phrase continuous counter 82*d* is equal to or greater than "03", the process returns to the step S155 so as to re-select a phrase, determining that the same phrase has been continuously selected for three times. On the other hand, if "NO" in the step S161, that is, if the count value of the phrase continuous counter 82*d* is less than "03", the process directly advances to a step S167, determining that the number of times that the same phrase has been selected is equal to or less than two.

In addition, if "NO" in the step S157, that is, unless the selected phrase number and the stored phrase number agree, the selected phrase number is stored (overwritten) into the phrase-number storing area 84 of the main memory 40 in a step S163, and having determined that the same phrase was not continuously selected, the count value of the phrase continuous counter 82*d* is set (reset) to "00" in a step S165, and the process advances to a step S167.

In the step S167, it is determined whether or not the array in-small-number flag 80*b* is turned on. If "YES" in the step S167, that is, if the array in-small-number flag 80*b* is turned on, one portion of the selected phrase is appropriately thinned out in a step S169, and the process advances to a step S181 shown in FIG. 16. On the other hand, if "NO" in the step S167, that is, unless the array in-small-number flag 80*b* is turned on, the process directly advances to a step S181 shown in FIG. 16.

Figure 16:
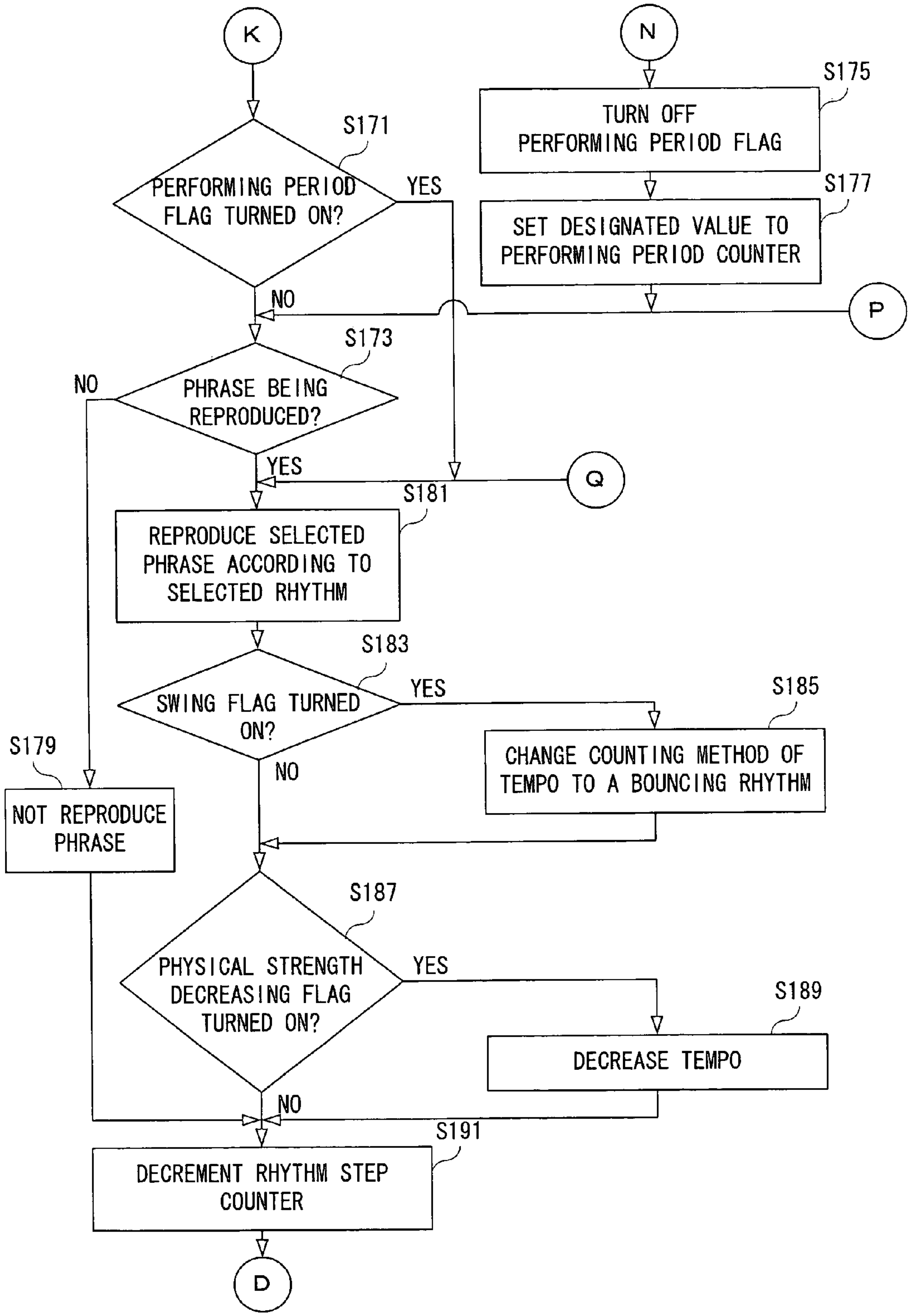
FIG. 16 is a flowchart showing yet still another portion of the BGM generation and the reproduction process of the CPU shown in FIG. 2.

As described above, in the step S129 in FIG. 14, if it is determined that the count value of the rhythm step counter 82*a* is not "00", it is determined whether or not the performing period flag 80*e* is turned on in the step S171 as shown in FIG. 16. If "YES" in the step S171, that is, if the performing period flag 80*e* is turned on, the process directly advances to a step S181. On the other hand, if "NO" in the step S171, that is, if the performing period flag 80*e* is turned off, the process advances to a step S173.

Furthermore, as described above, if it is determined that the designated value of the performance suspended period counter 82*c* is not "00," in the step S149 in FIG. 14, the performing period flag 80*e* is turned off in a step S175 shown in FIG. 16, and in a step S177, the designated value is set to the performing period counter 82*b*, and then the process advances to the step S173.

In the step S173, it is determined whether or not the phrase is being reproduced. If "NO" in the step S173, that is, unless the phrase is being reproduced, the phrase is not reproduced in a step S179, and the process directly advances to a step S191. On the other hand, if "YES" in the step S173, that is, if the phrase is being reproduced, the selected phrase is reproduced in the step S181 according to the selected rhythm, and then the process advances to the step S183.

Figure 20:
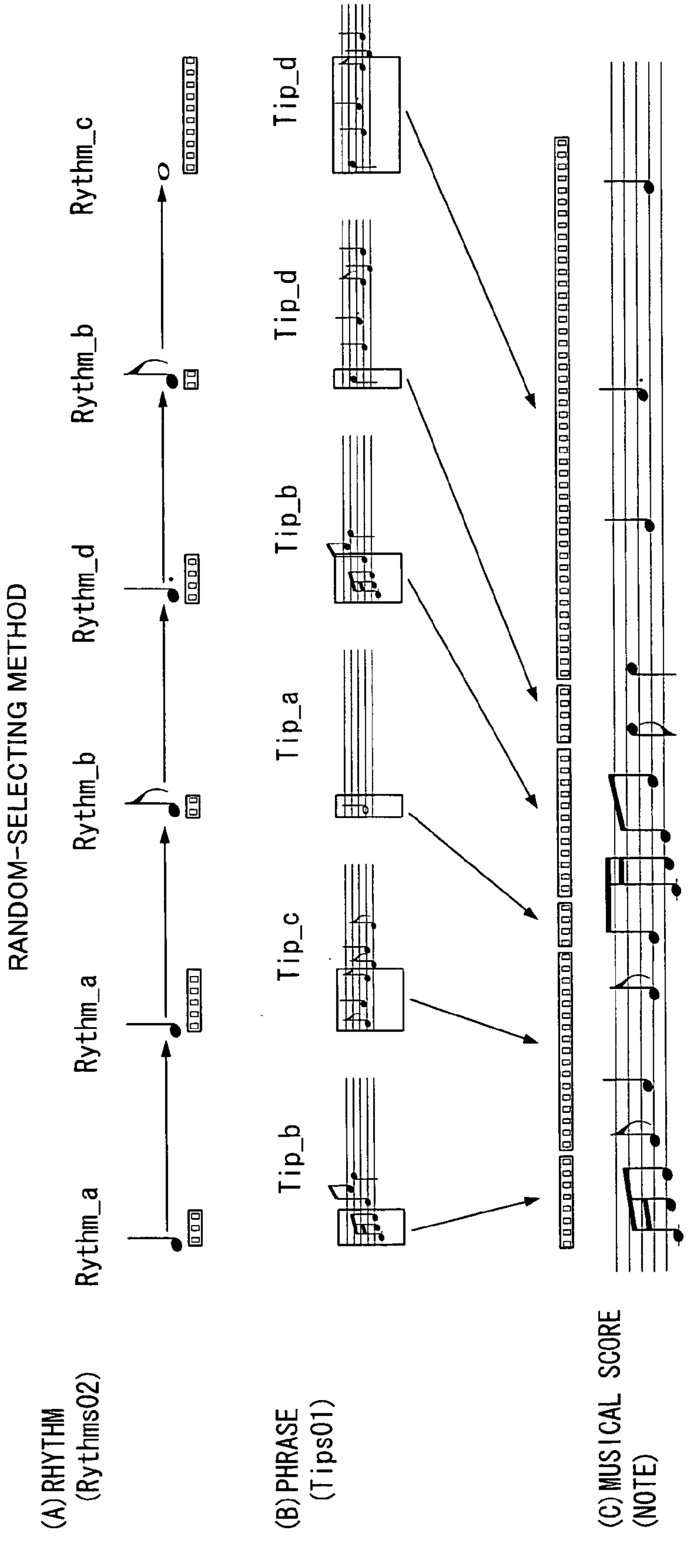
FIG. 20 is an illustrative view showing the generating method of the BGM in a case of selecting the rhythm in a random selecting method.

FIG. 20 is an illustrative view for describing a method of generating the BGM (musical script) to be performed if the random-selecting method is selected as a method of selecting the rhythm. As shown in FIG. 20 (A), it is provided that the rhythm group 2 (Rhythms02) is selected, and the rhythm A data (Rhythm_a) 780*a*, the rhythm A data (Rhythm_a) 780*a*, the rhythm B data (Rhythm_b) 780*b*, the rhythm D data (Rhythm_d) 780*d*, the rhythm B data (Rhythm_b) 780*b*, and the rhythm C data (Rhythm_c) 780*c* are selected in order in the random-selecting method, for example.

In addition, the phrase group 1 (Tips01) is selected, and as described above, the phrase number included in this phrase group 1 is randomly selected, and the phrase data that corresponds to the selected phrase number is selected from the phrase storing area 770, for example. As described in FIG. 20 (B), it is provided that the phrase is selected in the order of the phrase B data (Tip_b) 770*b*, the phrase C data (Tip_c) 770*c*, the phrase A data (Tip_a) 770*a*, the phrase B data (Tip_b) 770*b*, the phrase D data (Tip_d) 770*d*, and the phrase D data (Tip_d) 770*d*.

Each rhythm data (musical tone) shown in FIG. 20 (A) corresponds to each phrase data (phrase), shown in FIG. 20 (B) and described above. The rhythm data defines the length of the performance and the pronunciation timing for performing the phrase data. Therefore, similar to the case of the sequential-selecting method shown in FIG. 17, the musical score (note) as shown in FIG. 20 (C) is generated.

More specifically, the phrase B data 770*b* that corresponds to the initial (first) rhythm A data 780*a* is extracted by the length equal to the quarter note that corresponds to the rhythm A data 780*a*. That is, the initial sixteenth note, the second sixteenth note, and the third sixteenth note that correspond to the phrase B data 770*b* are extracted.

Similarly, in the phrase C data 770*c* that corresponds to the second rhythm A data 780*a*, the first eighth note, the second quarter note, and the third eight note are extracted. The phrase constructed of one note (half note) is in the phrase A data 770*a* that corresponds to the third rhythm B data 780*b*, so that the sound indicated by the half note is extracted by the length equal to the eighth note that corresponds to the rhythm B data 780*ba*. In the phrase B data 770*b* that corresponds to the fourth rhythm D data 780*d*, the first sixteenth note, the second sixteenth note, the third eighth note, and the fourth eighth note are extracted. In the phrase D data 770*d* that corresponds to the fifth rhythm B data 780*b*, the sound indicated by the first quarter note is extracted by the length equal to the eighth note that corresponds to the rhythm B data 780*b*. Furthermore, the phrase D data 770*d* that corresponds to the sixth rhythm C data 780*c*, the first quarter note, the second quarter note, and the third dotted quarter note, and the fourth eighth note is extracted.

It is noted that the example shown in FIG. 20, similar to the example shown in FIG. 17, shows a state that each of the rhythm data and the phrase data is selected six times, and at each time that the rhythm data and the phrase data are selected for one time, the phrase according to the selected rhythm is reproduced, and once the phrase equal to the length designated by the rhythm has been reproduced, the subsequent rhythm data and the phrase data are selected. Such a process is repeated, and thus the BGM is reproduced.

In addition, as shown in FIG. 18 (B), when the random-selecting method is selected as the selecting method of the rhythm, as described above, each of the rhythm data and the phrase data is randomly selected. Furthermore, as described above, if the random-selecting method is selected, one period (cycle) is counted at each time that one rhythm data constructing the rhythm pattern is selected.

Therefore, when the designated value "02" is set to the performing period counter 82*b*, this performing period counter 82*b* is decremented each time that the rhythm data is selected, and when the count value of the performing period counter 82*b* becomes "00", the performance is suspended. When the performance is suspended, the designated value "03" is set to the performance suspended period counter 82*c*, and this performance suspended period counter 82*c* is decremented each time that the rhythm data is selected. When the count value of the performance suspended period counter 82*c* becomes "00", the state is moved (returned) from the performance suspended state to the performing state.

In the performance suspended period, the phrase data is masked for the same reason as in the sequential-selecting method.

Thus, in the random-selecting method, the performing period and the performance suspended period are measured (counted) depending on the number of times the rhythm data is selected, so that even when the state is moved from the performance suspended state to the performing state, no deviance occurs in the timing of outputting the phrase.

An instance of the reproduction of the BGM is the same as the above-described sequential-selecting method.

Returning to FIG. 16, it is determined, in the step S183, whether or not the swing flag 80*d* is turned on. If "YES" in the step S183, that is, in a case that the swing flag 80*d* is turned on, the counting method of the tempo is changed to a bounding rhythm, in a step S185, and the process advances to a step S187. On the other hand, if "NO" in the step S183, if the swing flag 80*d* is turned off, the process directly advances to the step S187.

In the step S187, it is determined whether or not the physical strength decreasing flag 80*c* is turned on. If "NO" in the step S187, that is, if the physical strength decreasing flag 80*c* is turned off, the process directly advances to a step S191. On the other hand, if "YES" in the step S187, that is, if the physical strength decreasing flag 80*c* is turned on, the tempo is decreased in a step S189, and then the process advances to the step S191.

In the step S191, the rhythm step counter 82*a* is decremented, and the process returns to the step S41 shown in FIG. 10. That is, until the count value of the rhythm step counter 82*a* becomes "00", the selected phrase is reproduced according to the selected rhythm, and when the count value of the rhythm step counter 82*a* becomes "00", the subsequent rhythm is randomly selected, and the subsequent phrase is randomly selected.

It is noted that, although omitted in the generating and reproducing processes of the BGM, the BGM data to be generated may be transposed according to the transposition data 724*i*. A flag (transposition flag), to be turned on/off according to a predetermined operation of the player, the proceeding situation of the game, or a predetermined event, etc., is stored in the flag storing area 80, and if the transposition flag is turned on, it is possible to transpose the BGM data to be generated. Thereby, it is also possible to perform the BGM having a half tone made higher, lower, and so forth.

According to this illustrative embodiment, the BGM data is generated from the phrase data selected randomly, according to the conductor data, selected depending on the proceeding situation of the game, and the rhythm data, selected according to a predetermined rule, so the probability of performing the same BGM is at its lowest. That is, an entertaining aspect of the game can be enhanced, and it is possible to prevent a loss of the interest, in the game itself, stemming from the same BGM being performed.

In addition, the BGM data is generated using the phrase data and the rhythm data prepared in advance, so that it is not necessary to generate the phrase data and the rhythm data (rhythm pattern). Therefore, the process load of the CPU is not increased.

It is noted that, although in this illustrative embodiment, if the array of the PIKMINs is decreased, one portion of the phrase selected in one part (track) is appropriately thinned out and reproduced, the reproduction of an arbitrary one or more of the track(s) may be suspended.

Furthermore, in this illustrative embodiment, although the phrase data and the rhythm data are divided into groups, and stored in plural number, it is possible to generate the various BGMs on the condition that at least one group is provided for each of the data in any case.

Moreover, in this illustrative embodiment, a change is applied to the BGM to be reproduced according to the operation of the player, the proceeding situation (event) of the game, etc. However, these are merely examples, any event can be determined by a developer such as a game programmer, etc. That is, it is necessary to take into consideration the point that the change is applied to the reproduced BGM according to an arbitrary event, etc.

In addition, in this illustrative embodiment, although only the video game device as shown in FIG. 1 is described. However, the illustrative embodiment can be adapted to a game device integrally provided with a monitor and a speaker, a handheld game device, a handheld telephone receiver provided with a game function, etc.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A game apparatus operable to execute a game music generating program stored on a storage medium, said game apparatus comprising:

a phrase data storage area that stores different kinds of a plurality of phrase data, based on a musical characteristic, wherein said phrase data designate a length and a pitch of a pronunciation of a tone color;

a rhythm-pattern storage area that stores at least one kind of rhythm pattern data, constructed of rhythm data, that designate a length in performance for performing a phrase, and a timing of said phrase;

game music-data reproducing programmed logic circuitry that reproduces game music data constructed of at least one part;

a tone storage area that stores data of a sound output according to said music data;

a continuous counter for counting the number of times the same phrase has been selected; and sound outputting programmed logic circuitry that outputs a sound according to the music data reproduced by said music-data reproducing programmed logic circuitry, wherein said game music generating program is capable of being executed by a processor of said game apparatus to perform the steps of:

randomly selecting one kind of the phrase data stored in said phrase data storage area including incrementing said continuous counter when the phrase data selected last time and the phrase data selected this time agree and re-selecting the phrase data when a count value of said continuous counter is larger than a predetermined value;

selecting one rhythm data from one kind of the rhythm pattern data stored in said rhythm-pattern storage area according to a predetermined rule; and generating the music data from the phrase data selected by said randomly selecting one kind of the phrase and the rhythm data selected by said selecting one kind of rhythm data.

2. A game apparatus according to claim 1, wherein said selecting one kind of rhythm includes randomly selecting the rhythm data from one kind of said rhythm pattern data.

3. A game apparatus according to claim 1, wherein said rhythm selecting step includes sequentially selecting the rhythm data from one kind of said rhythm pattern data in predetermined order.

4. A game apparatus according to claim 1, further comprising at least one operating control that inputs an operation from a player; and performance-change data storage area that stores performance-change data that changes a performing method of a game music, wherein said game music generating program is capable of being executed by said processor of said game apparatus to further perform the steps of:

storing performance-change data corresponding to at least the operation of said at least one operating control in said performance-change data storage area; and applying a predetermined change to said game music data, corresponding to the performance-change data, stored in said performance-change data storage area by said storing performance-change data.

5. A game apparatus according to claim 1, further comprising a period designating data storage area that stores period designating data that designates a performing period and a performance suspended period of the phrase, wherein said game music-data reproducing programmed logic circuitry suspends a reproduction of the game music data in the performance suspended period based on said period designating data, and allows said processor to execute the step of counting the performing period and the performance suspended period designated by said period designating data, by the number of times the rhythm data has been selected.

6. A game apparatus according to claim 4, wherein, applying a predetermined change includes changing a tempo of said game music data according to said performance-change data.

7. A game music generating method of a game apparatus provided with a phrase data storage area that stores different kinds of a plurality of phrase data, based on a musical characteristic, wherein said phrase data designate a length and a pitch of a tone, a rhythm-pattern storage area that stores at least one kind of rhythm pattern data constructed of rhythm data that designate a length in performance for performing a phrase, and a timing of said phrase;

game music-data reproducing programmed logic circuitry that reproduces game music data constructed of at least one part;

a tone storage area that stores data of a sound, output according to said game music data;

a continuous counter for counting the number of times the same phrase has been selected; and sound outputting programmed logic circuitry for outputting the sound according to the game music data reproduced by said game music-data reproducing programmed logic circuitry, said game music generating method comprising:

(a) randomly selecting one kind of the phrase data stored in said phrase data storage area including incrementing said continuous counter when the phrase data selected last time and the phrase data selected this time agree and re-selecting the phrase data when a count value of said continuous counter is larger than a predetermined value;

(b) selecting one rhythm data from one kind of the rhythm pattern data stored in said rhythm-pattern storage area; and (c) generating the game music data from the phrase data selected by said step (a) and the rhythm data selected by said step (b).

8. The method of claim 7, wherein the selecting a one rhythm data includes randomly selecting a rhythm data.

9. The method of claim 7, wherein the selecting a one rhythm data includes sequentially selecting a rhythm data.

10. A game apparatus that performs a game music corresponding to at least a proceeding situation of a game, comprising:

a phrase data storage area that stores different kinds of a plurality of phrase data, based on a musical characteristic, wherein said phrase data designate a length and a pitch of a tone;

a rhythm-pattern storage area that stores at least one kind of rhythm pattern data, constructed of rhythm data, that designate a length in performance for performing a phrase and a timing of said phrase;

game music-data reproducing programmed logic circuitry that reproduces game music data constructed of at least one part;

a tone storage area that stores data of a sound output according to said game music data;

a continuous counter for counting the number of times the same phrase has been selected;

phrase selecting programmed logic circuitry that randomly selects one kind of the phrase data stored in said phrase data storage area including incrementing said continuous counter when the phrase data selected last time and the phrase data selected this time agree and re-selecting the phrase data when a count value of said continuous counter is larger than a predetermined value;

rhythm-pattern selecting programmed logic circuitry that selects one rhythm data from one kind of the rhythm pattern data stored in said rhythm-pattern storage area according to a predetermined rule;

game music generating programmed logic circuitry that generates said game music data from the phrase data selected by said phrase selecting programmed logic circuitry and the rhythm data selected by said rhythm-pattern selecting programmed logic circuitry, and sound outputting programmed logic circuitry that outputs the sound according to the game music data reproduced by said game music-data reproducing mechanism.

11. A method for generating a sequence of game music in a game apparatus, comprising the steps of:

providing at least one set of rhythm data;

providing at least one set of phrase data;

selecting a set of rhythm data from the at least one set of rhythm data;

selecting a set of phrase data from the at least one set of phrase data;

counting the number of times the currently selected set of phrase data has been continuously selected;

re-selecting a new set of phrase data if the currently selected phrase data has been continuously selected more than a predetermined number of times, and generating game music data from the selected rhythm data and the selected phrase data for output via the game apparatus.

12. The method of claim 11, wherein the selecting a set of rhythm data includes randomly selecting a set of rhythm data.

13. The method of claim 11, wherein the selecting a set of rhythm data includes sequentially selecting a set of rhythm data.

14. The method of claim 11, wherein the selecting a set of phrase data includes randomly selecting a set of phrase data.

* * * * *